(12) United States Patent
Lorenz et al.

(10) Patent No.: US 9,416,857 B2
(45) Date of Patent: *Aug. 16, 2016

(54) ROTATIONAL VIBRATION DAMPING ASSEMBLY

(75) Inventors: Daniel Lorenz, Bad Kissingen (DE); Thomas Weigand, Schweinfurt (DE); Cora Carlson, Dittelbrunn (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 192 days.

This patent is subject to a terminal disclaimer.

(21) Appl. No.: 13/699,913

(22) PCT Filed: Apr. 11, 2011

(86) PCT No.: PCT/EP2011/055601
§ 371 (c)(1),
(2), (4) Date: Feb. 22, 2013

(87) PCT Pub. No.: WO2011/147633
PCT Pub. Date: Dec. 1, 2011

(65) Prior Publication Data
US 2013/0203541 A1    Aug. 8, 2013

(30) Foreign Application Priority Data

May 25, 2010  (DE) .......................... 10 2010 029 255

(51) Int. Cl.
*F16H 47/08*  (2006.01)
*F16H 35/00*  (2006.01)
*F16F 15/14*  (2006.01)
(Continued)

(52) U.S. Cl.
CPC ................ *F16H 35/00* (2013.01); *F16D 13/38* (2013.01); *F16D 33/18* (2013.01); *F16D 47/06* (2013.01); *F16F 15/131* (2013.01); *F16F 15/13157* (2013.01); *F16F 15/14* (2013.01); *F16F 15/1478* (2013.01); *F16H 45/02* (2013.01); *F16H 47/08* (2013.01); *F16H 57/0006* (2013.01); *H02K 5/24* (2013.01); *H02K 7/006* (2013.01); *F16H 2045/021* (2013.01); *F16H 2045/0205* (2013.01); *F16H 2045/0221* (2013.01); *F16H 2045/0268* (2013.01)

(58) Field of Classification Search
CPC .. F16R 15/13157; F16R 15/14; F16R 15/131; F16R 15/1478; F16D 33/18; F16D 47/06; F16H 47/08; F16H 57/0006; F16H 2045/0268; F16H 2045/0221
USPC ....................... 475/36, 53, 59, 329, 341, 347; 192/55.61, 2, 12
See application file for complete search history.

(56) References Cited

U.S. PATENT DOCUMENTS 5,733,218 A  *  3/1998  Sudau et al. .................. 475/347
5,863,274 A  *  1/1999  Jackel .......................... 475/347
(Continued)

*Primary Examiner* — Roger Pang
(74) *Attorney, Agent, or Firm* — Cozen O'Connor

(57) ABSTRACT

A torsional vibration damping arrangement includes an input region to be driven in rotation around an axis of rotation and an output region. A first torque transmission path and parallel thereto a second torque transmission path and a coupling arrangement for superposing the torques transmitted via the torque transmission paths are provided between the input region and the output region. A first phase shifter arrangement is provided in the first torque transmission path for generating a phase shift of rotational irregularities transmitted via the first torque transmission path relative to rotational irregularities transmitted via the second torque transmission path.

25 Claims, 25 Drawing Sheets

(51) Int. Cl.
  *F16D 47/06* (2006.01)
  *F16F 15/131* (2006.01)
  *F16H 57/00* (2012.01)
  *F16D 13/38* (2006.01)
  *F16D 33/18* (2006.01)
  *H02K 5/24* (2006.01)
  *H02K 7/00* (2006.01)
  *F16H 45/02* (2006.01)

(56) References Cited

U.S. PATENT DOCUMENTS

| | | | |
|---|---|---|---|
| 5,944,610 A * | 8/1999 | Sudau | 464/24 |
| 6,003,650 A * | 12/1999 | Kleifges | 192/70.17 |
| 6,058,801 A * | 5/2000 | Schierling et al. | 464/68.3 |
| 6,083,133 A * | 7/2000 | Dye | 475/230 |
| 6,099,434 A * | 8/2000 | Sasse et al. | 475/347 |
| 6,231,472 B1 * | 5/2001 | Sudau et al. | 475/347 |
| 6,334,816 B1 * | 1/2002 | Wack et al. | 464/68.92 |
| 2002/0033310 A1 * | 3/2002 | Sasse et al. | 192/3.29 |
| 2013/0068580 A1 * | 3/2013 | Doegel et al. | 192/3.28 |
| 2013/0072338 A1 * | 3/2013 | Dogel et al. | 475/116 |
| 2013/0085030 A1 * | 4/2013 | Dogel et al. | 475/59 |
| 2014/0047949 A1 * | 2/2014 | Lorenz et al. | 74/664 |
| 2014/0123929 A1 * | 5/2014 | Orlamunder | F02B 75/06 123/192.2 |
| 2014/0274562 A1 * | 9/2014 | Ukon et al. | 477/175 |
| 2015/0308540 A1 * | 10/2015 | Lorenz | F16F 15/13157 464/68.1 |

* cited by examiner

| | Mass inertias | | |
|---|---|---|---|
| 1 | $M_E\_min$ | 0.05 | $kgm^2$ |
| 2 | $M_E\_max$ | 2 | $kgm^2$ |
| 3 | $M_1\_min$ | 0.01 | $kgm^2$ |
| 4 | $M_1\_max$ | 1.5 | $kgm^2$ |
| 5 | $M_2\_min$ | 0.0005 | $kgm^2$ |
| 6 | $M_2\_max$ | 1 | $kgm^2$ |
| 7 | $M_A\_min$ | 0.01 | $kgm^2$ |
| 8 | $M_A\_max$ | 2.5 | $kgm^2$ |
| | $M_{ges} = M_E + M_1 + M_2 + M_A$ | | |
| 9 | $M_{ges}\_min$ | 0.07 | $kgm^2$ |
| 10 | $M_{ges}\_max$ | 7 | $kgm^2$ |
| | favorable ratio of mass inertias in the first torque transmission path | | |
| 11 | $d = M_E/M_1$ | | |
| 12 | $d\_opt$ | 1 - 10 | |
| | favorable ratio of the mass inertias between the two torque trtansmission paths | | |
| 13 | $e = M_1/M_2$ | | |
| 14 | $e\_opt$ | 2 - 20 | |
| | Stiffnesses | | |
| 15 | $S_1\_min$ | 1 | Nm/° |
| 16 | $S_1\_max$ | 70 | Nm/° |
| 17 | $S_2\_min$ | 0.01 | Nm/° |
| 18 | $S_2\_max$ | > 1500 | Nm/° |
| | Fluidic damping | | |
| 19 | $F_1\_min$ | 0 | Nms/rad |
| 20 | $F_1\_max$ | 10 | Nms/rad |
| 21 | $F_2\_min$ | 0.01 | Nms/rad |
| 22 | $F_2\_max$ | 1000 | Nms/rad |
| | Frictional damping | | |
| 23 | $R_1\_opt$ | 0 | Nm |
| | Coupling arrangement | | |
| 24 | $i\_min$ | 0.5 | |
| 25 | $i\_max$ | 2 | |
| 26 | $i\_opt$ | 1 +/- 30% | |

Fig. 22

ROTATIONAL VIBRATION DAMPING ASSEMBLY

PRIORITY CLAIM

This is a U.S. national stage of Application No. PCT/EP2011/055601, filed on 11 Apr. 2011, which claims priority to German Application No. 10 2010 029 255.9, filed 25 May 2010, the contents of which are incorporated herein by reference.

BACKGROUND OF THE INVENTION

1. Field of the Invention

The present invention is directed to a torsional vibration damping arrangement such as can be used, for example, in the drivetrain of a vehicle to damp and as far as possible eliminate rotational irregularities.

2. Description of the Related Art

Especially in drivetrains constructed with internal combustion engines, a constant torque can generally not be introduced into a drivetrain because periodic ignitions occur in the internal combustion engines and the energy released as a result is converted into a rotational movement of the crankshaft. The torque delivered by the crankshaft and the rotational speed thereof are both subject to fluctuations and oscillations or, generally speaking, rotational irregularities. Because rotational irregularities of this type may be noticeable in driving mode, a general objective is to eliminate these rotational irregularities as far as possible.

For example, it is known to use energy accumulators or energy storages, i.e., for example, springs or moving masses or combinations thereof, to temporarily store the energy occurring in rotational irregularities of the kind mentioned above and then to guide it into the drivetrain in such a way that a smoother speed characteristic or torque characteristic can be achieved. Two-mass flywheels are an example of torsional vibration damping arrangements operating in this manner. Mass pendulums known as mass dampers convert the rotational irregularities occurring in driving condition into oscillating deflections of vibrating masses; the deflection is carried out in opposition to centrifugal force and, by predefining the deflection path and the masses to be deflected, it is possible to tune to particular excitation speeds or excitation frequencies. Mass dampers of this type can, of course, be combined with systems of masses which execute oscillations through the use of springs or the like.

Because of the increasingly restricted space availability in modern vehicles, there is also less installation space available for the systems used for vibration damping with consequent loss of decoupling quality, i.e., in the reduction of occurring rotational irregularities.

It is the object of the present invention to provide a torsional vibration damping arrangement of compact construction which achieves an improved reduction of rotational irregularities introduced into a drivetrain.

According to the invention, this object is met through a torsional vibration damping arrangement, particularly for the drivetrain of a vehicle, comprising an input region to be driven in rotation around an axis of rotation and an output region, wherein a first torque transmission path and parallel thereto a second torque transmission path and a coupling arrangement for guiding together and superposing the torques transmitted and occurring via the torque transmission paths are provided between the input region and the output region, wherein a first phase shifter arrangement is provided in the first torque transmission path for generating a phase shift of rotational irregularities transmitted via the first torque transmission path relative to rotational irregularities transmitted via the second torque transmission path.

In the torsional vibration damping arrangement according to the invention, it is ensured through the use of the phase shifter arrangement that a destructive superposition of oscillation components occurs in the torque to be transmitted in that the transmitted torque is first divided and then recombined by the phase shift that is introduced. Ideally, the rotational irregularities are virtually completely eliminated at least in a particularly critical frequency range.

In order that this phase shift can be achieved efficiently in a structurally simple manner, the first phase shifter arrangement comprises a first oscillation system having a primary side and a secondary side which is rotatable relative to the primary side around the axis of rotation against the force of a spring arrangement.

The first phase shifter arrangement is accordingly constructed substantially on the basis of the operating principle of a two-mass oscillator in which two masses, i.e., essentially the primary side and secondary side, oscillating relative to one another against the action of the spring arrangement are provided with a desired oscillation behavior through selection of spring stiffness on the one hand and of mass ratios and inertia at the primary side and secondary side on the other hand. An oscillation system of this kind characteristically has a resonant frequency. In the frequency range below the resonant frequency, an oscillation system of this kind exhibits subcritical oscillations, i.e., excitation and reaction of the system occur substantially simultaneously. When the resonant frequency is exceeded, a phase shift occurs so that excitation and reaction occur substantially out of phase with one another and the system accordingly operates supercritically. This phase shift which ideally and at most has a value of 180° is made use of by the present invention to achieve the desired reduction in rotational irregularities in that the torque oscillation component that is phase-shifted in this way is superposed with the non-phase-shifted torque oscillation component.

Further, a second phase shifter arrangement can advantageously be provided in the second torque transmission path. This second phase shifter arrangement can also comprise a second oscillation system with a primary side and a secondary side which is rotatable relative to the primary side around the axis of rotation against the action of a spring arrangement.

To ensure that a desired reduction in rotational irregularities is achieved when working with a phase shifter arrangement in the two torque transmission paths, the first oscillation system and the second oscillation system have resonant frequencies that differ from one another. In this way, a frequency range and speed range can be defined in which one of the two torque transmission paths operates in supercritical state, while the other still operates in subcritical state, i.e., without a phase shift.

In so doing, it is preferably provided that the resonant frequency of the first oscillation system is below the resonant frequency of the second oscillation system.

In order to further influence the damping behavior, the first torque transmission path and/or the second torque transmission path is formed with a frictional damping arrangement and/or a fluidic damping arrangement for rotational irregularities transmitted via this torque transmission path.

Of course, the two torque transmission paths can be formed differently, i.e., each of the two torque transmission paths can be formed with or without one and/or the other additional damping aspect.

Particularly when frictional damping and fluidic damping are to be additionally provided in one or both torque transmission paths, a parallel action or serial action thereof can be provided depending on the manner in which they are to influence damping behavior. In this case also, the two torque transmission paths can again also be configured such that they differ from one another.

Further, a diversification of the damping behavior can be achieved in that the frictional damping arrangement and/or the fluidic damping arrangement are/is arranged so as to act in parallel or in series with the spring arrangement.

In an embodiment which is particularly advantageous because of the compact size, the coupling arrangement comprises a planetary transmission arrangement.

In this respect, the construction can be carried out, for example, in such a way that the planetary transmission arrangement comprises a planet gear carrier which is connected to the second torque transmission path and which has a plurality of planet gears rotatably carried thereon.

This means that the torque transmitted into the second torque transmission path is received by the planet gear carrier and then relayed to the output region via the planet gears rotatably carried thereon.

In order that the above-mentioned coupling of the two torque components can also be realized in a simple manner such that there is a destructive superposition, the planetary transmission arrangement comprises a first ring gear arrangement in meshing engagement with the planet gears which is connected to the first torque transmission path and a second ring gear arrangement in meshing engagement with the planet gears which is connected to the output region.

In an alternative embodiment form which makes use of installation space available chiefly in the radially inner region, the planetary transmission arrangement comprises a first sun gear arrangement in meshing engagement with the planet gears which is connected to the first torque transmission path and a second sun gear arrangement in meshing engagement with the planet gears which is connected to the output region.

The behavior by which rotational irregularities can be eliminated in the torque to be transmitted can be influenced further in that the torque components to be introduced into or transmitted by the two torque transmission paths are influenced with respect to magnitude. For example, it can be provided that the first ring gear arrangement or sun gear arrangement in connection with the planet gears and the second ring gear arrangement or sun gear arrangement in connection with the planet gears provide transmission ratios which differ from one another. Through the selection of transmission ratios which are not identical to one another, it is possible to conduct a larger torque component via the first torque transmission path or also via the second torque transmission path.

Since the planetary transmission arrangement acting as coupling arrangement is operative only in a comparatively small angular range permitted by the phase shifter arrangement and the oscillation system thereof, it can further be provided that at least one planet gear and/or the ring gear arrangement and/or the sun gear arrangement are/is constructed in the manner of a segmented gear.

An embodiment which is particularly advantageous for preventing imbalances can be provided in that the planet gears are arranged so as to be substantially circumferentially equidistant from one another. Alternatively, it is possible that the planet gears are arranged at unequal distance from one another circumferentially. By varying the circumferential spacing of the planet gears, it is possible to influence the noise generation thereof and therefore to achieve a quieter running.

Mainly the radially inner installation space is used efficiently when the coupling arrangement is arranged radially inside the first phase shifter arrangement and/or the second phase shifter arrangement and therefore in an at least partially axially overlapping manner.

Alternatively, it can be provided that the coupling arrangement is arranged axially adjacent to the first phase shifter arrangement and/or the second phase shifter arrangement. In this embodiment, it is possible to configure the coupling arrangement so as to be comparatively large in size axially, i.e., with larger effective radii.

A particularly efficient superposition of the oscillation components transmitted via the two torque transmission paths can be achieved when the second torque transmission path has a stiffness of at least 800 Nm/°, preferably at least 1500 Nm/°. This means that the second torque transmission path, or the structural component parts or assemblies providing this second torque transmission path, are comparatively stiff and an elasticity leading to the phase shift is used substantially only in the first torque transmission path.

It has further been shown that the vibration damping characteristic is especially advantageously pronounced when a ratio of a mass moment of inertia of the input region to a mass moment of inertia in the first torque transmission path is in the range of 1 to 10 and/or when a ratio of a mass moment of inertia in the first torque transmission path to a mass moment of inertia in the second torque transmission path is in the range of 2 to 20.

The present invention is further directed to a hybrid drive module and a hydrodynamic coupling arrangement, particularly a hydrodynamic torque converter, with a torsional vibration damping arrangement according to the invention.

Further, the present invention is directed to a drive system for a vehicle comprising a drive unit and a torsional vibration damping arrangement according to the invention, wherein the input region thereof can be coupled to a driveshaft of the drive unit.

In a drive system of this kind, it is advantageously ensured that a resonance of the first oscillation system is below or near the idling speed of the drive unit. With this resonance, i.e., the resonant frequency of the first oscillation system converted into a rotational speed, it is ensured that the phase difference initiated by the occurrence of the phase shift in the region of resonance and the resulting superposition of phase-shifted oscillation components can be utilized practically in the entire speed range.

It can further be provided that a resonance of the second oscillation system is above or near the maximum speed of the drive unit.

BRIEF DESCRIPTION OF THE DRAWINGS

The present invention will be described in detail in the following with reference to the accompanying drawings.

FIG. 22 is a table showing different quantities or ratios of quantities and associated values and value ranges.

DETAILED DESCRIPTION OF THE PREFERRED EMBODIMENTS

Figure 1:
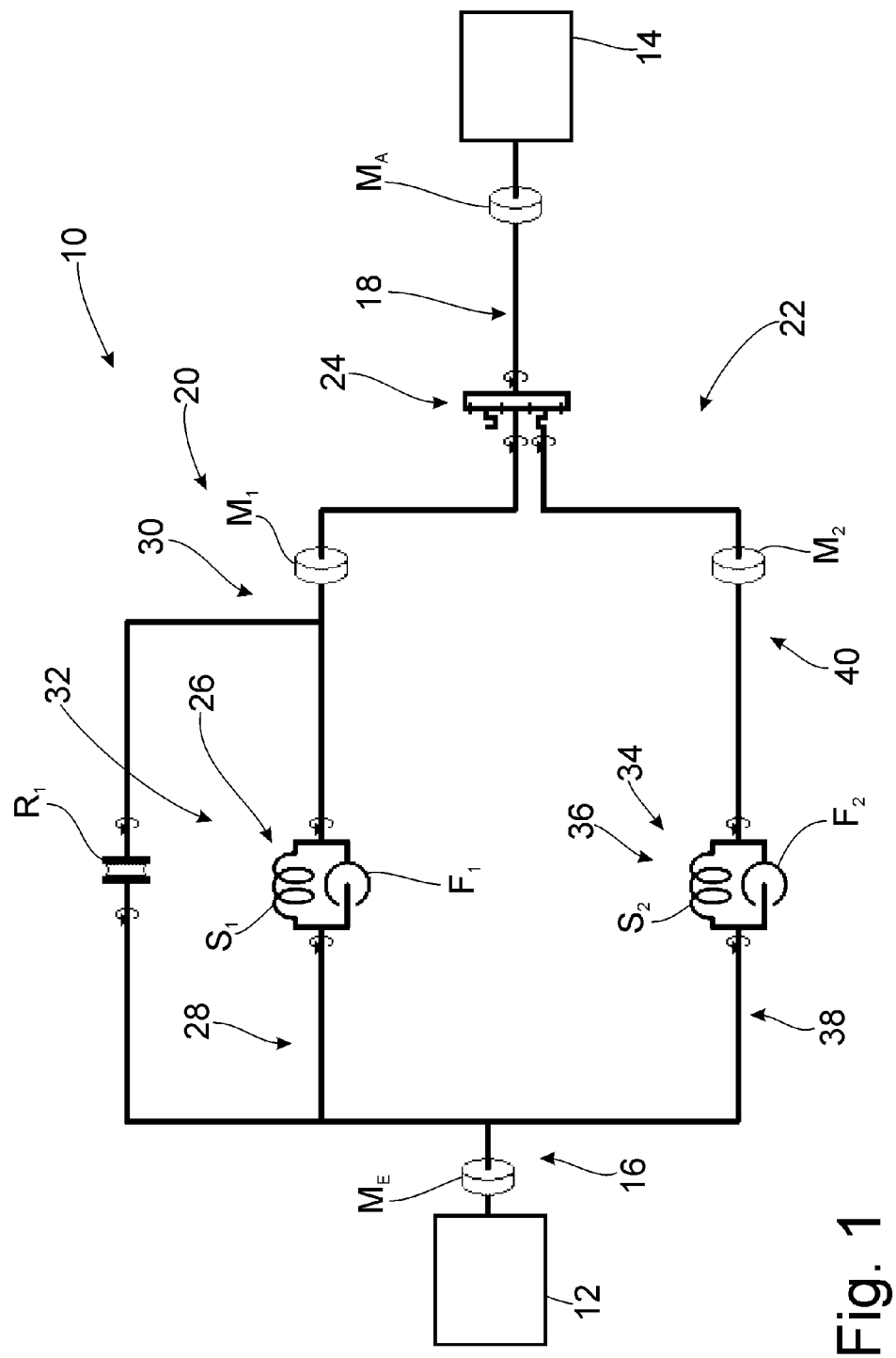
FIG. 1 is a schematic diagram of a torsional vibration damping system with two parallel torque transmission paths.

FIG. 1 schematically shows a torsional vibration damping arrangement 10 provided in the drivetrain of a vehicle. The torsional vibration damping arrangement 10 transmits a torque between a drive unit 12 which is shown only schematically, e.g., an internal combustion engine, and a transmission 14 or the like system areas of a drivetrain.

The torque to be transmitted via the torsional vibration damping arrangement 10 is received in an input region, designated generally by 16, to which an inertia or mass moment of ihnertia $M_E$ can be assigned. The torque conducted via the torsional vibration damping arrangement 10 is delivered via an output region 18, and an inertia or mass moment of inertia $M_A$ can be assigned to the output region 18.

The torque to be transmitted is split into two torque components between the input region 16 and the output region 18. A first torque component is transmitted via a first torque transmission path 20, while the second torque component is transmitted via a second torque transmission path 22. A unification or coupling together of the two torque components is carried out in a coupling arrangement 24 which receives both torque components and then sends them onward in direction of the output region 18.

In order that the rotational irregularities which are generated, for example, in the region of the drive unit 12 and which generally have an oscillating character are eliminated as far as possible and not conveyed further in direction of the transmission 14 or other drivetrain components, it is ensured in the torsional vibration damping arrangement 10 according to the invention that the oscillation components in the torque to be transmitted undergo a phase shift relative to one another in the two torque transmission paths 20, 22. To this end, a first phase shifter arrangement 26 is provided in the first torque transmission path 20. This first phase shifter arrangement 26 is constructed as first oscillation system 32 in which two masses can oscillate relative to one another against the action of a spring arrangement. This spring arrangement has a predetermined stiffness or spring constant $S_1$. The two masses oscillating relative to one another are substantially defined by a primary side 28 and a secondary side 30 of this oscillation system 32. The mass or mass moment of inertia of the primary side 28 substantially corresponds to the mass inertia $M_E$ of the input region 16. The secondary side 30 has a mass inertia or a mass moment of inertia $M_1$. The oscillation system 32 in the first torque transmission path 20 has a resonant frequency that is determined by the stiffness or spring constant $S_1$ and by the two masses or inertias $M_E$ and $M_1$. With vibrational excitation at a frequency below the resonant frequency, this oscillation system 32 operates subcritically, which means that excitation and reaction occur substantially simultaneously, i.e., without a mutual phase difference. When the resonant frequency is exceeded, the oscillation system 32 passes into a supercritical state in which excitation and reaction occur out of phase with one another which essentially means a phase shift of a maximum of 180°. This means that oscillation components contained in the torque component to be transmitted via the first torque transmission path 20 are conveyed further in direction of the coupling arrangement 24 so as to be shifted in phase by at most 180° when the excitation frequency lies above the resonant frequency of the oscillation system 32.

The quality of the phase shift, i.e., the magnitude of the phase difference generated, depends on different conditions, particularly also on the friction effects occurring in the region of the oscillation system 32, while the location of the transition is defined by the resonant frequency of the oscillation system 32.

In order to further influence the damping behavior during torque transmission via the first torque transmission path 20, a frictional damping arrangement $R_1$ and a fluidic damping arrangement $F_1$ are further provided in this first torque transmission path 20. In the example shown in FIG. 1, these two damping arrangements $R_1$, $F_1$ are operatively parallel to one another and to the spring arrangement 26 of the oscillation system 32. While the frictional damping arrangement $R_1$ generally operates with Coulomb friction, i.e., structural component parts which are displaceable relative to one another under sliding friction, the fluidic damping arrangement $F_1$ can be operable by means of the displacement of a viscous medium, for example, oil or grease, during relative rotation between the primary side 28 and the secondary side 30.

In the example of a torsional vibration damping arrangement 10 shown in FIG. 1, a second phase shifter arrangement 34 is also associated with the second torque transmission path 22. This second phase shifter arrangement 34 also comprises a second oscillation system 36 with primary side 38 and secondary side 40 which are rotatable relative to one another against the action of a spring arrangement which is represented in this case by a stiffness or spring constant $S_2$. Accordingly, the oscillation behavior of this oscillation system 36 is substantially determined by the relatively oscillating masses or mass moments of inertia $M_E$ of the input region 16 and $M_2$ of the secondary side 40, respectively, apart from the stiffness and spring constant $S_2$. Further, it will also be seen that a fluidic damping arrangement $F_2$ connected in parallel with stiffness $S_2$ is associated with the phase shifter arrangement 34. Of course, a frictional damping arrangement could also be provided as can be seen in association with the first torque transmission path 20.

Through the selection of the configuration of the second phase shifter arrangement 34, it is possible to position its resonant frequency in such a way or tune to the resonant frequency of the first phase shifter arrangement 26 in such a way that the phase shift, i.e., the transition to the supercritical state, will occur at a different frequency and, therefore, at a different speed. In particular, as will be demonstrated in the following referring to embodiment forms, the stiffness $S_2$ of the second phase shifter arrangement can be selected in such a way that the resonant frequency of the second phase shifter arrangement 34 lies in a range which is outside the excitation spectrum occurring in the drivetrain. This means that the second phase shifter arrangement 34 and oscillation system 36 thereof will not pass into a supercritical state in the excitation spectrum to be expected under normal driving conditions. As a result, the torque components which are guided together again in the region of the coupling arrangement 24 ideally have a phase difference of 180° with respect to the oscillation components contained therein so that a superposition is generated for the purpose of a destructive interference. As a result, there remain at the output region 18 only comparatively small oscillation components which can then be further conveyed in direction of the drivetrain.

In this connection, it must be emphasized that an oscillation system 32, 36 of the type mentioned above which is generally constructed in the manner of a two-mass flywheel works like a lowpass filter, i.e., substantially filters out higher-frequency oscillation components. If one of the torque transmission paths, for example, the second torque transmission path 22, is designed without such filtering functionality, this means that the low-frequency oscillation components can be destructively superposed with one another at the coupling arrangement 24, but the high-frequency oscillation components are now transmitted via only one of the torque transmission paths so that a destructive superposition is not possible. However, the low-frequency excitation components in a drivetrain are generally those that are noticeable for the occupants of the vehicle and/or lead to an excessively high load on the drivetrain and must therefore be damped or eliminated.

Figure 2:
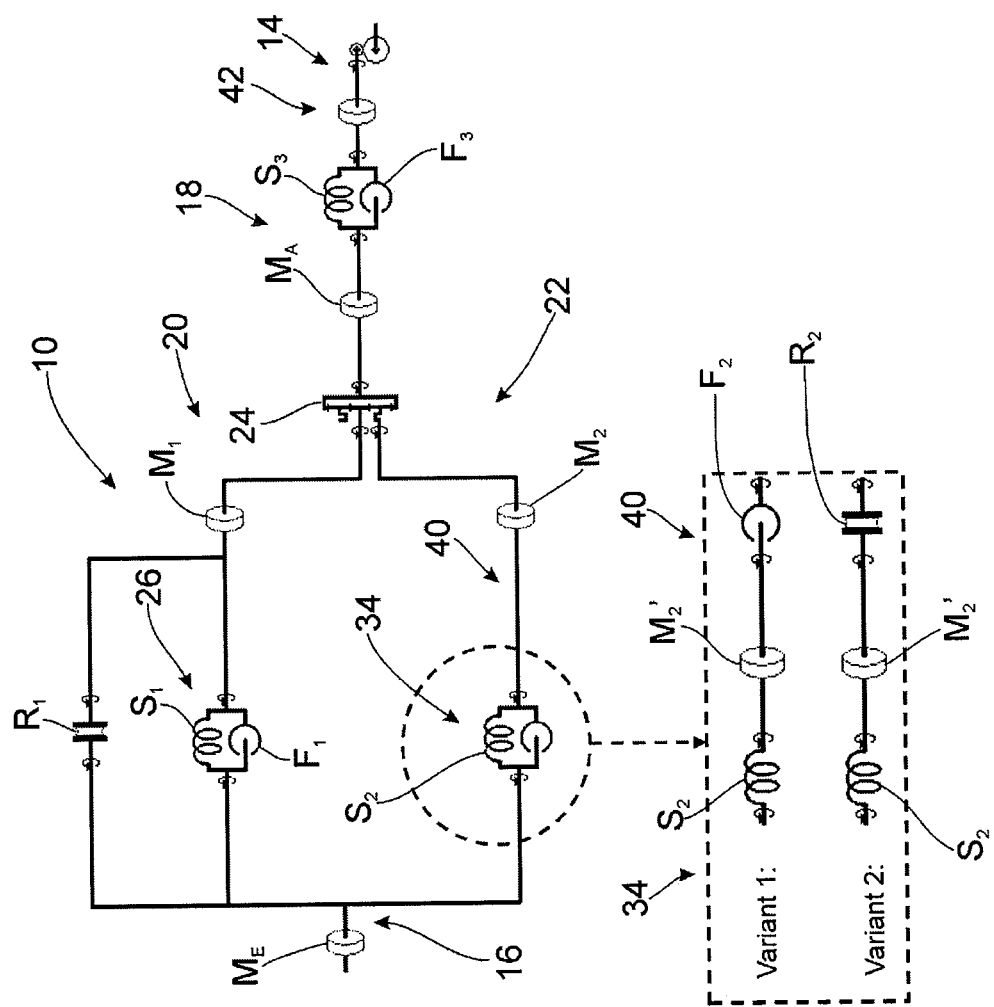
FIG. 2 is a view corresponding to FIG. 1 of an alternative embodiment.

FIG. 2 illustrates different modifications of the torsional vibration damping arrangement 10 shown in FIG. 1. First, it will be seen in FIG. 2 that a further oscillation system 42 provided, for example, in a clutch disk, with a stiffness $S_3$ and also with a fluidic damping arrangement $F_3$ can be provided following the output region 18.

FIG. 2 also illustrates two variants for the embodiment of the second phase shifter arrangement 34 of the second torque transmission path 22. First, it will be seen in variant 1 that a fluidic damping arrangement $F_2$ is provided in this case in series with stiffness $S_2$ at the secondary side 40, and there results between the spring arrangement, i.e., stiffness $S_2$, and the fluidic damping arrangement $F_2$ owing to the components arranged therein a mass moment of inertia $M_2'$ of the secondary side 40 which then also substantially influences the oscillation behavior. In variant 2, a frictional damping arrangement $R_2$ is provided in place of the fluidic damping arrangement arranged in series with stiffness $S_2$.

Of course, the frictional damping arrangement $R_1$ and fluidic damping arrangement $F_1$ can also be connected in series with stiffness $S_1$ in the first torque transmission path 20.

Figure 3:
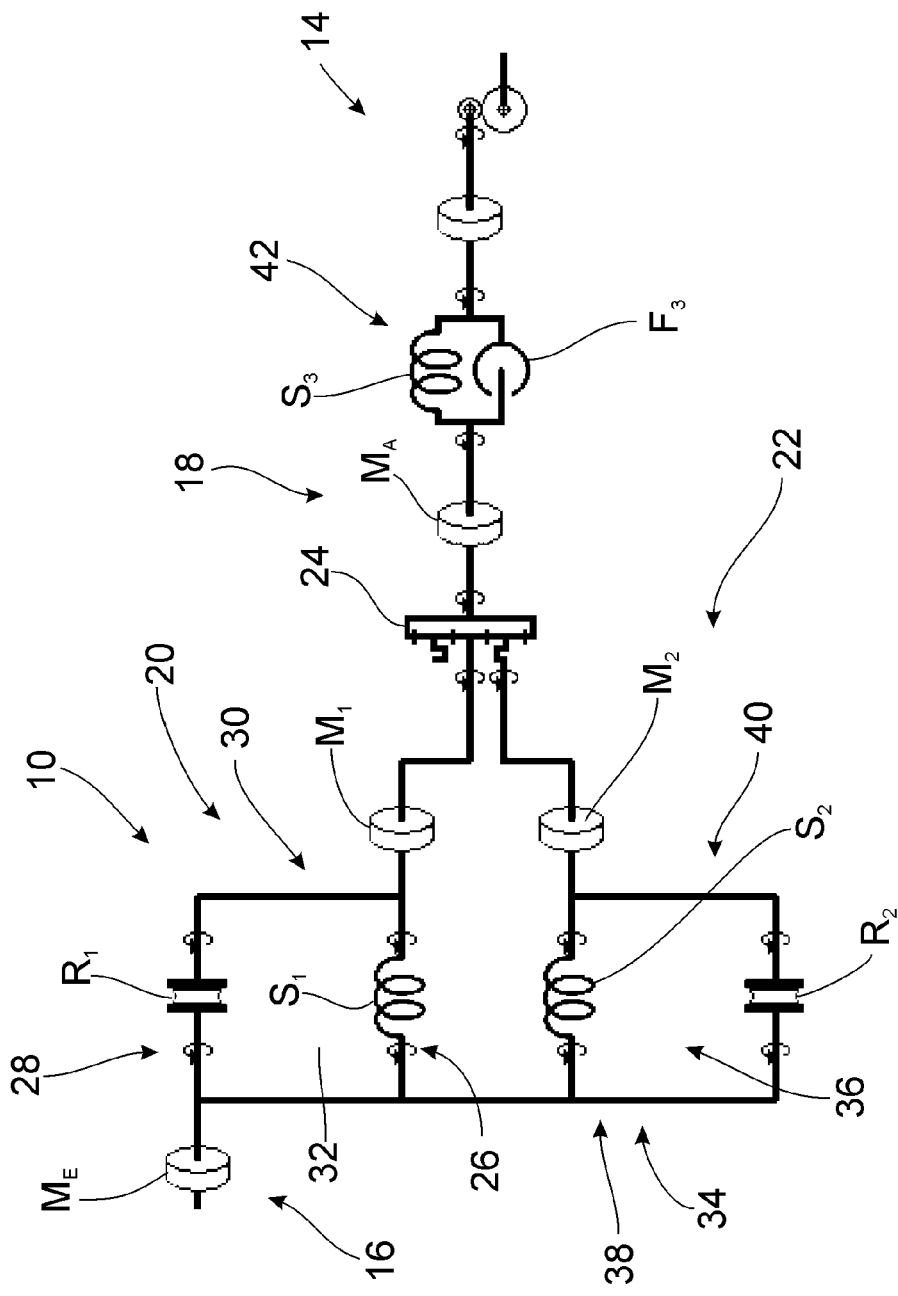
FIG. 3 is a view corresponding to FIG. 1 of an alternative embodiment.

A further embodiment is shown in FIG. 3. The phase shifter arrangements 26, 34 mentioned above with stiffnesses $S_1$ and $S_2$ of the respective oscillation systems 32, 36 are seen in both torque transmission paths 20, 22. Further, frictional damping arrangements $R_1$ and $R_2$ are seen parallel to stiffnesses $S_1$, $S_2$.

Different embodiments of schematically illustrated torsional vibration damping arrangements have been described above referring to FIGS. 1 to 3 in which, by means of dividing the torque to be transmitted into two torque transmission paths and generating a phase shift or phase difference in at least one of the torque transmission paths, it is ensured that when the torque components are guided together the oscillation components or rotational irregularities transmitted via the torque transmission paths are superposed so as to cancel one another out. Since the basic torque, i.e., the constant torque to be transmitted per se, does not undergo a phase shift, these basic torque components which are conducted via the two torque transmission paths are superposed in the coupling arrangement 23 so as to be added together, so that the entirety of the base torque which is introduced into the input region 16 and is to be transmitted, ignoring any unavoidable friction losses, can be tapped at the output region 18 of the torsional vibration damping arrangement 10 and can be transmitted into the subsequent portion of the drivetrain.

Various constructional embodiments of a torsional vibration damping arrangement 10 of the kind mentioned above will be described in the following. Components and system areas in the following which correspond to components and system areas described above are designated by the same reference numerals.

Figure 4:
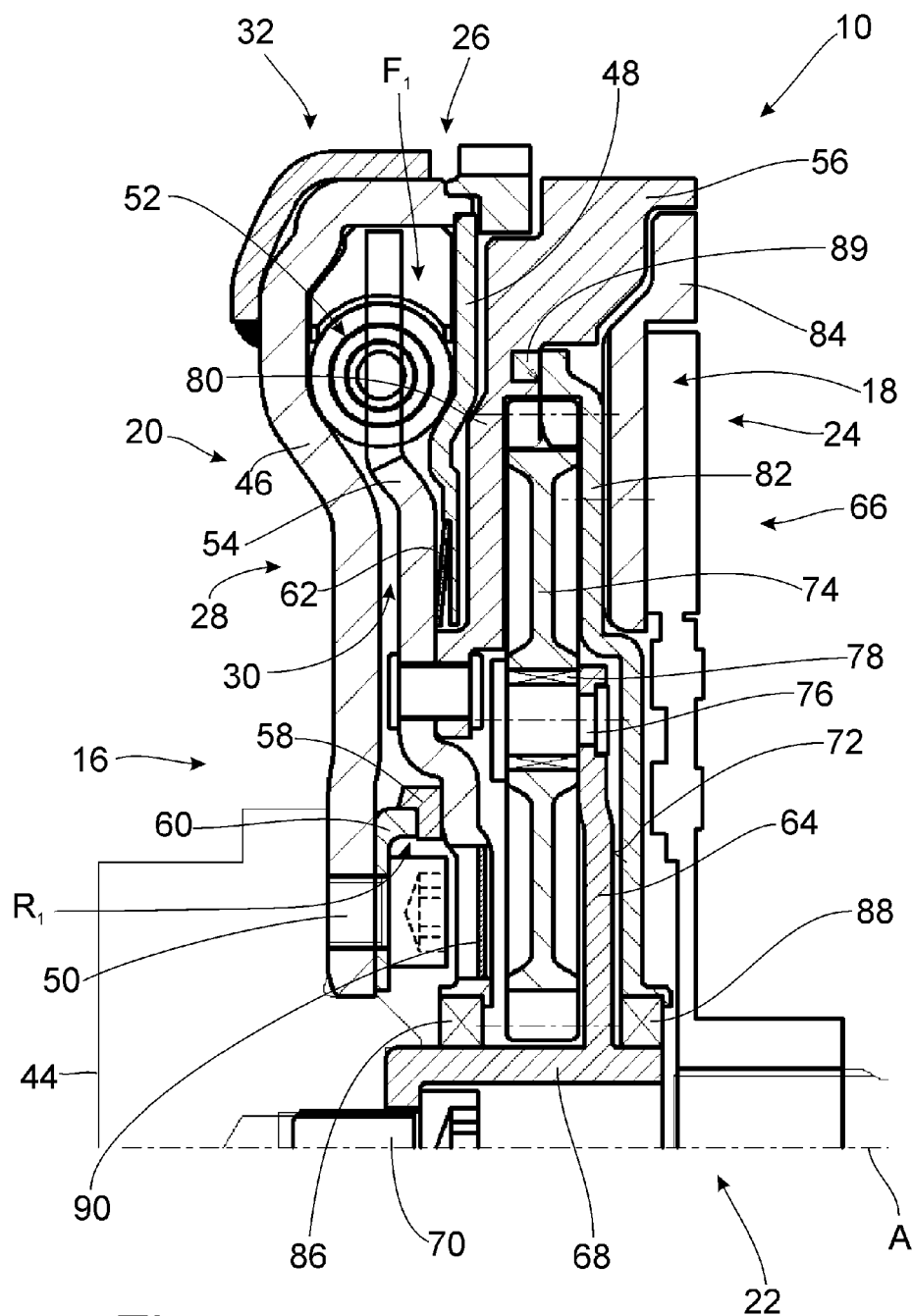
FIG. 4 is a fragmentary longitudinal sectional view of a torsional vibration damping arrangement with two parallel torque transmission paths.

In FIG. 4, the input region 16 of the torsional vibration damping arrangement 10 is connected to a driveshaft 44, for example, the crankshaft of an internal combustion engine, and is also at least partially provided by it. The primary side 28 of the oscillation system 32 in the first torque transmission path 20 comprises two cover disk elements 46, 48. Cover disk element 46 is fixedly connected in its radially inner region to the driveshaft 44 by screw bolts 50 and in its radially outer region with the other cover disk element 48 defines a receiving chamber for the damper spring arrangement 52 providing stiffness $S_1$. As is also conventional, for example, in two-mass flywheels or other torsional vibration dampers, this damper spring arrangement 52 can comprise a plurality of helical compression springs arranged successively in circumferential direction or nested one inside the other.

The secondary side 30 of the first oscillation system 32 comprises a central disk element 54 which engages between the two cover disk elements 46, 48 and which, like the cover disk elements 46, 48, provides circumferential supporting regions for the spring arrangement 52 in its radially outer region. In its region located radially inside the cover disk element 48, the central disk element 54 is fixedly connected, e.g., riveted, to a mass part 56. Radially inside this riveted region, the central disk element 54 is axially supported at a thrust washer and plain bearing ring 58. The latter is held axially and radially at an angled supporting element 60 which is fixed together with the cover disk element 46 at the driveshaft 44 by screw bolts 50.

A pre-loading element 62, for example, a disk spring, which is supported at the cover disk element 48 and at the central disk element 54 presses the central disk element 54 into contact with the thrust washer 58. The volume region surrounded by the two cover disk elements 46, 48 is enclosed so as to be substantially fluid tight by the pre-loading element 62 on the one hand and the thrust washer 58 on the other hand and can accordingly be filled with a viscous medium. This viscous medium is displaced during circumferential relative movement between the primary side 28 and the secondary side 30 so that the fluidic damping arrangement $F_1$ to be provided in the first torque transmission path 20 can be realized in this way. At the same time, a Coulomb friction, i.e., the frictional damping arrangement $R_1$ which is operative during relative rotation between the primary side 28 and the secondary side 30, can be provided by the frictional contact between, e.g., the pre-loading element 62 or the thrust washer 58 and the central disk element 54.

Both the frictional damping arrangement $R_1$ and the fluidic damping arrangement $F_1$ can be provided by other assemblies or additional assemblies which act in a damping manner during relative rotation between the primary side 28 and the secondary side 30.

The second torque transmission path 22 substantially comprises a planet gear carrier 64 of a planetary transmission arrangement, designated generally by 66. The function of this planet gear carrier 64 will be described in the following. This planetary transmission arrangement 66 in turn substantially also provides the coupling arrangement 24 in which the torque components conducted via the two torque transmission paths 20, 22 are guided together again.

Radially inwardly, the planet gear carrier 64 is constructed with a cylindrical portion 68. This cylindrical portion 68 is connected centrally to the driveshaft 44 by a screw bolt 70 and is accordingly connected therewith for common rotation around the axis of rotation A. It will be seen that this connection is substantially carried out in this case by clamping, i.e., by generating a clamping force and, therefore, a frictional clamping effect. As is the case with the fastening of the cover disk element 46, it is also possible here to realize a positive connection by means of a configuration that is not rotationally symmetrical and to use the screw connection substantially only for producing axial integrity.

A planet gear carrier portion 72 which is disk-shaped or arm-shaped, for example, adjoins the outer circumference of the cylindrical portion 68. Planet gears 74 are rotatably carried at this planet gear carrier portion 72 at a plurality of circumferential positions by support pins 76 and bearing bushings 78. The planet gears 74 are substantially freely rotatable with respect to the planet gear carrier 64.

In their radially outer region, the planet gears 74 are in meshing engagement with a drive-side ring gear 80 which is provided by the mass part 56 of the secondary side 30 of oscillation system 32. A driven-side ring gear 82 lies axially opposed to the drive-side ring gear 80 and, for example, together in connection with an annular friction surface element 84 for a frictional coupling, substantially provides the output region 18 of the torsional vibration damping arrangement 10.

Like the secondary side 30 of the first oscillation system 32, the driven-side ring gear 82 can be rotatably supported in its radially inner region by a bearing 86 and 88, respectively, at the outer circumference of the cylindrical portion 68 of the planet gear carrier 64 and can therefore be centered with respect to the axis of rotation A. In view of the fact that the driven-side ring gear 82 is generally rotatable around the axis of rotation A relative to the drive-side ring gear 80, a seal element 89 can be provided at one of these structural components parts, at the drive-side ring gear 80 in the present instance, in a region radially outside of the teeth formed at these two ring gears 80, 82 so that the volume region receiving the planet gears 74 is enclosed radially outwardly in a fluid-tight manner. In its radially inner region, this volume region is closed in a fluid-tight manner by the two bearings 86, 88 which are constructed, for example, as plain bearing rings and by closure caps 90 which also close through-holes in the central disk element 54. This volume region can also be filled with viscous medium so that a lubricating effect can be achieved for the planet gears 74 on the one hand and a fluidic damping assistance can be achieved during rotation of the planet gears 74 around their axis of rotation parallel to axis of rotation A on the other hand. In a rotating condition, the viscous medium, i.e., oil or grease, used for achieving the lubricating effect is displaced by centrifugal force radially outward, i.e., into that region in which the planet gears 74 in meshing engagement with the two ring gears 80, 82 are subject to comparatively heavy wear. Therefore, a comparatively small amount of viscous medium suffices to achieve this effect. It is not necessary to fill the entire enclosed volume region.

It will be seen in FIG. 4 that the second torque transmission path 22 is substantially stiff, i.e., is configured at least in a first approximation with infinitely high stiffness $S_2$. Accordingly, the oscillation components of the torque which are transmitted into this second torque transmission path 22 are transmitted substantially without phase difference or phase shift and also substantially without a damping effect being produced. However, the first phase shifter arrangement 26 with the first oscillation system 32 thereof is provided in the first torque transmission path 20, and the construction of the first oscillation system 32 is substantially identical to a conventional torsional vibration damper or two-mass flywheel. Through selection of the mass ratios at the primary side 28 and at the secondary side 30 on the one hand and of the spring constant of the spring arrangement 32 on the other hand, it is possible to predefine the position of the resonant frequency or resonance of this first oscillation system 32 in such a way that, for example, it lies below the idling speed of a drive unit provided for a drive system or is at least close to this idling speed. This means that in the normal operating range the first oscillation system 32 will operate in the supercritical state, which means that the oscillation components of the torque component transmitted via the first torque transmission path 20 which are transmitted onward to the secondary side 30 are transmitted with a phase shift of a maximum of 180° relative to the exciting oscillation components and the oscillation components transmitted via the second torque transmission path 22.

Let it be assumed for the time being that no oscillation components are present, that is, a constant torque is introduced at the input region 16 and delivered at the output region 18. This means that the planet gear carrier 68 and the primary side 28 and the secondary side 30 and, therefore, the drive-side ring gear 82 rotate around the axis of rotation A at the same speed. As a result, the planet gears 24 do not rotate around their own axes of rotation. This in turn causes the driven-side ring gear 82 also to be rotated at the same speed as the planet gear carrier 72.

If there now occurs a spontaneous torque increase in the driveshaft 44 so as to give rise to vibrational excitation, this results in a corresponding rotational acceleration in the second torque transmission path 22, particularly of the planet gear carrier 72. Owing to the interaction of the planet gears 74 with the driven-side ring gear 82 of the planetary transmission arrangement 66, this causes a correspondingly increasing torque or a correspondingly increasing speed to be transmitted to the output region 18.

However, as a result of the spontaneous increase in torque and speed, a relative rotation between the primary side 28 and the secondary side 30 occurs in the first torque transmission path 20 by compression of the spring arrangement 52. This relative rotation causes the secondary side 30 to rotate temporarily at a somewhat lower speed than the primary side 28 and accordingly also at a lower speed than the planet gear carrier 72. As a result of this reduced speed, the planet gears 74 which are now driven by a speed difference between the secondary side 30 and the planet gear carrier 72 rotate around their own axes of rotation and, in so doing, also drive the driven-side ring gear 82. As a result, the driven-side ring gear 82 cannot follow the increasing speed of the planet gear carrier 72 because the rotation of the planet gears 74 caused by the secondary side 30 triggers a movement of the driven-side ring gear 82 in the opposite direction.

To this end, in that location where the two torque components are guided together, that is, where the planet gears 74 are in meshing engagement with the two ring gears 80, 82, oscillation components which are guided via the two torque transmission paths 20, 22 are superposed with one another so as to destructively interfere. In the ideal case which can only be achieved in theory, these superposed oscillation components are completely eliminated. Since, in practice, friction effects cannot be completely eliminated in the region of the first oscillation system 32, but primarily also because higher-frequency oscillation components may be desirable for damping, the phase shift occurring in the transition to the supercritical operating state will not be exactly 180° but rather will be somewhat smaller depending on the magnitude of the occurring friction effects.

Figure 5:
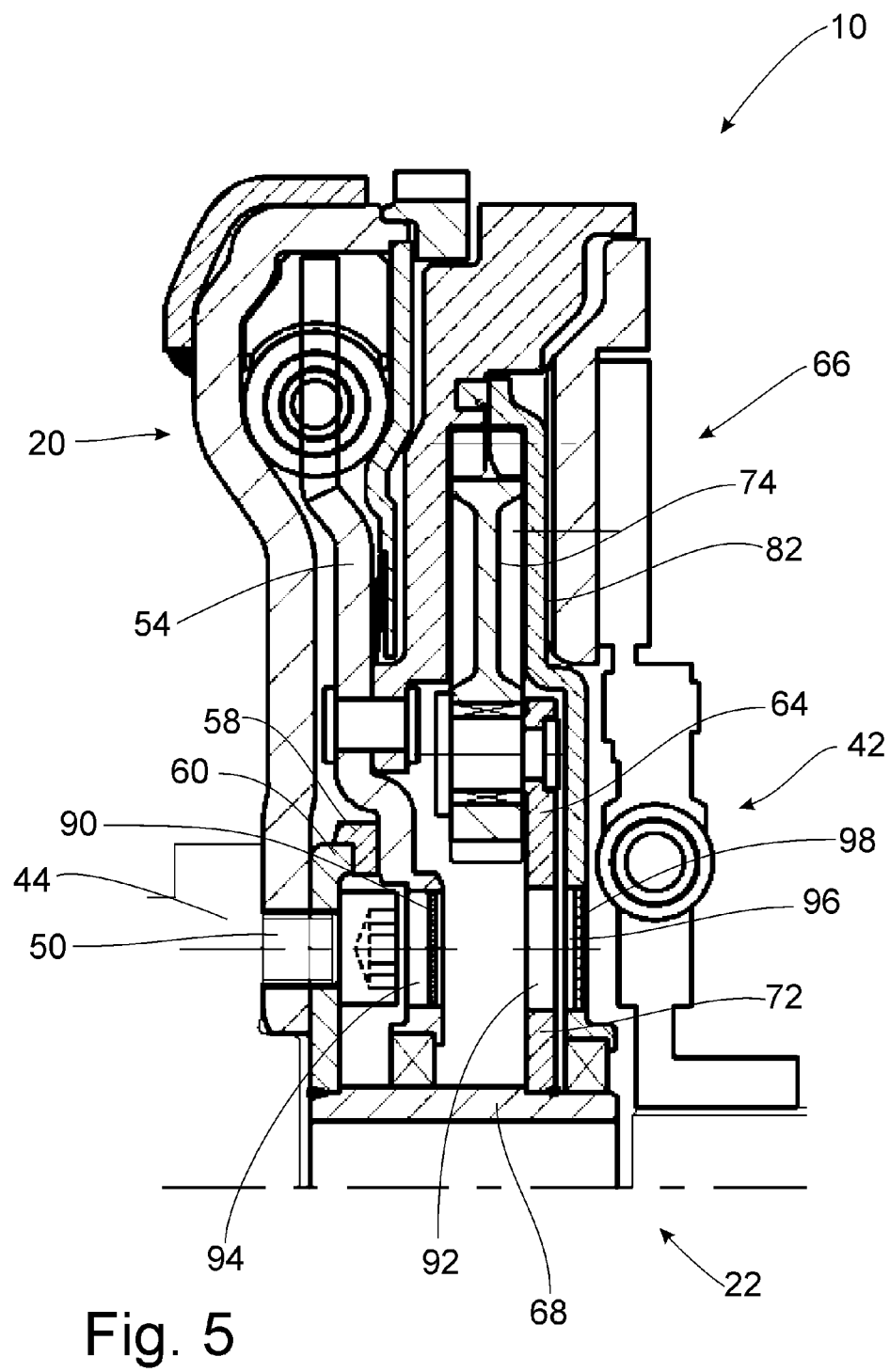
FIG. 5 is a view corresponding to FIG. 4 of an alternative embodiment.

A modified embodiment of a torsional vibration damping arrangement 10 is shown in FIG. 5. The following discussion will be limited to the changes made to the embodiment from FIG. 4.

Figure 6:
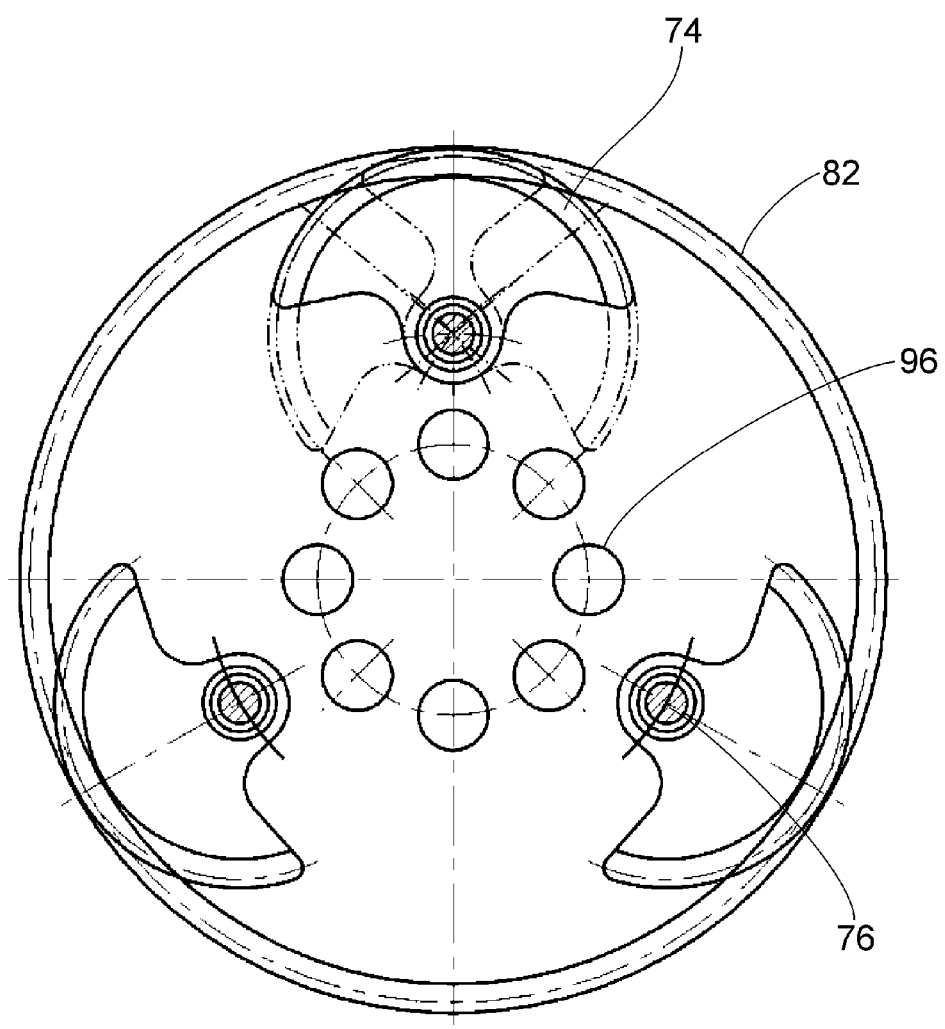
FIG. 6 is an illustration of segmented planet gears rotatably carried on a planet gear carrier.

In the torsional vibration damping arrangement 10 in FIG. 5, the planet gears 74 of the planetary transmission arrangement 66 are not constructed as fully circumferential gear wheels but as gear wheel segments. They are shown in meshing engagement with the driven-side ring gear 82 in FIG. 6. Since the drive-side ring gear 80 and the driven-side ring gear 82 will only carry out comparatively slight relative rotations with respect to the planet gear carrier 72 and, therefore, the planet gears 74 will also only rotate around their own axes of rotation in a certain angular range, the segmented configuration is sufficient and contributes to a reduction in the mass or mass moment of inertia.

It will further be seen in FIG. 5 that the planet gear carrier 64 with its cylindrical portion 68 and its radially outwardly extending planet gear carrier portion 72 rotatably carrying the planet gears 74 is formed of two parts. These two parts can be connected to one another by welding. The connection of the cylindrical portion 68 to the driveshaft 44 is carried out by means of the angular supporting element 60 which carries the thrust washer 58 in its radially outer region and which is connected to the cylindrical portion 68 of the planet gear carrier 64 in its radially inner region by welding. Accordingly, there is no need for a central screw fastening.

It will further be seen that the planet gear carrier 64 has through-holes 92 in its planet gear carrier portion 72. These through-holes 92 are positioned radially at the location where the screw bolts 50 must be inserted for fixing to the driveshaft 44. In a corresponding manner, the central disk element 50 also has through-holes 94 in its radially inner region and the driven-side ring gear 82 has through-holes 96 in its radially inner region. The through-holes 94 are closed by closing caps 90. In a corresponding manner, through-holes 96 are closed by closing caps 98 so that the volume region containing the planet gears 74 is again enclosed so as to be substantially fluid-tight.

Also in this embodiment, the second torque transmission path 22 is formed with very high stiffness, i.e., substantially without elasticity, compared to the first torque transmission path 20. Of course, the various structural component parts serving to transmit torque, particularly the planet gear carrier 64, undergo inevitable deformation or twisting in the presence of torque and accordingly, even with the comparatively stiff configuration, have a certain elasticity which, however, leads to a natural frequency appreciably above the relevant frequency range, i.e., outside of the speed range occurring in normal driving operation.

Figure 7:
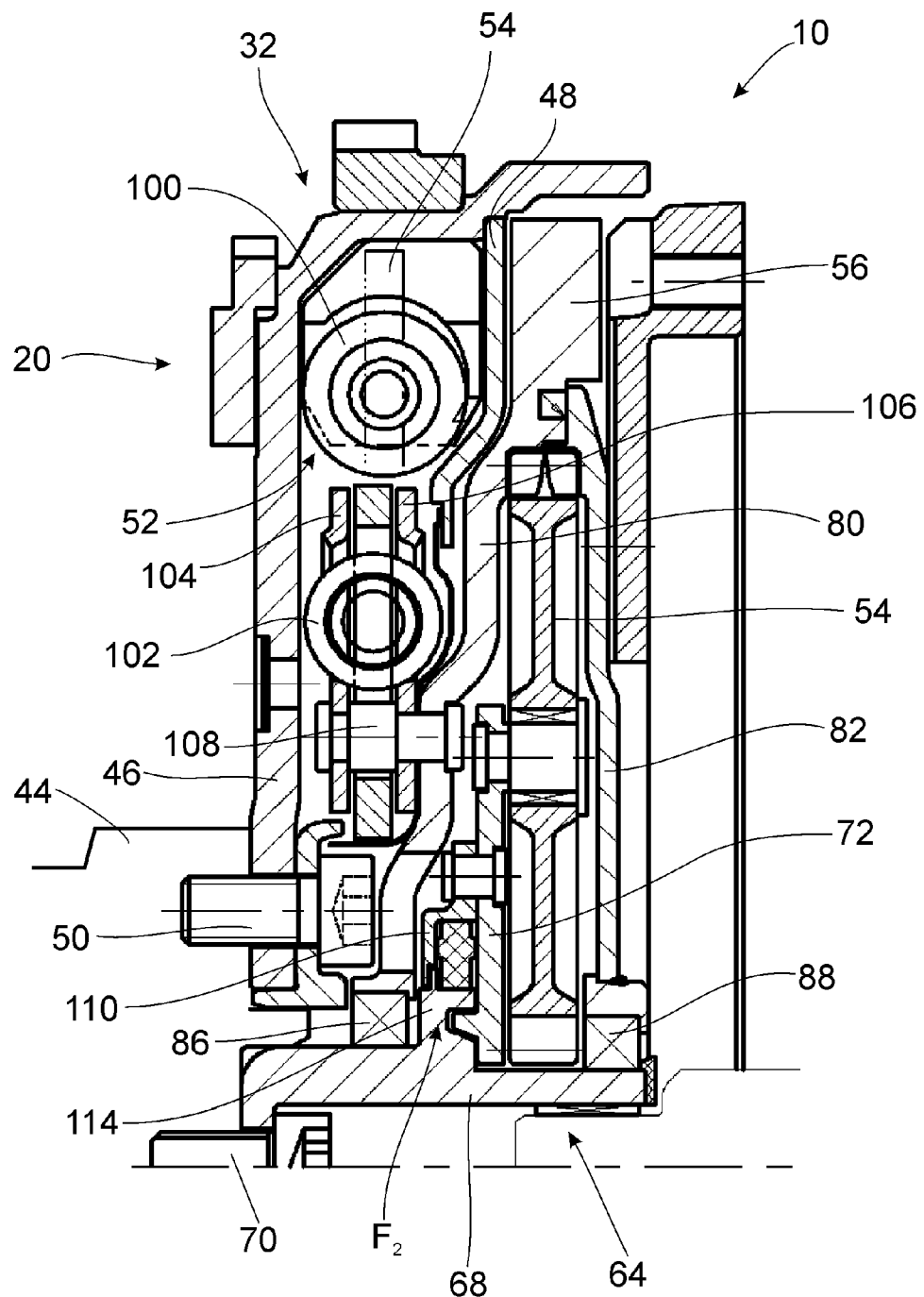
FIG. 7 is a view corresponding to FIG. 4 of an alternative embodiment.

A further modification is shown in FIG. 7. In this torsional vibration damping arrangement 10, the first oscillation system 32 in the first torque transmission path is formed of two stages. Here, the spring arrangement 52 comprises two spring sets 100, 102 which are radially staggered relative to one another. Spring set 100 receives a drive torque from the two cover disk elements 46, 48 and relays this drive torque to the central disk element 54. The central disk element 54 forms the input of the radially inner second damper stage. Further cover disk elements 104, 106 lie on both sides of the radially inner region of the central disk element 54. These further cover disk elements 104, 106 relay the torque received in the spring set 104 via the central disk element 54 to the drive-side ring gear 80 to which they are fixedly connected by rivet bolts 108.

The planet gear carrier 64 is constructed of multiple parts, and the cylindrical portion 68 thereof is centrally connected by screw bolts 70 to the driveshaft 44 so as to be fixed with respect to rotation relative to it. The radially inner region of the mass part 56, which also acts as drive-side ring gear 80, is supported on this cylindrical portion 68 by bearing 86.

Figure 9:
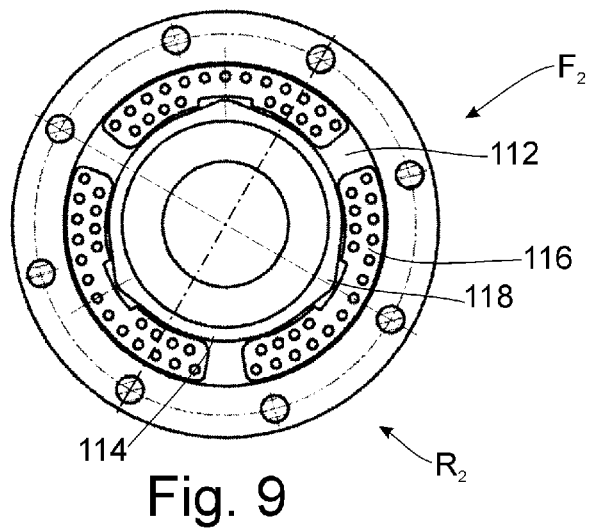
FIG. 9 is an axial view of a fluidic damping arrangement.

The planet gear carrier portion 72 is formed separate from the cylindrical portion 68 and is coupled therewith by a fluidic damping arrangement $F_2$ which will be described in the following referring to FIG. 9.

It will be seen that the planet gear carrier portion 72 together with an annular disk-shaped cover element 110 forms a receiving chamber 112 for a plurality of displacement elements or shear keys disposed successively in circumferential direction. This receiving chamber 112 is bounded radially inwardly by an annular projection 114 at the cylindrical portion 68 of the planet gear carrier 64. Radially outwardly projecting driving portions 118 associated with the shear keys 116 are formed at this annular projection 114 so as to compel a corresponding driving of the shear keys 116 during circumferential movement of the cylindrical portion 68. As is shown in FIG. 7, these shear keys 116 contact the planet gear carrier portion 72 or cover element 110 by their two axial end faces and can be clamped between these two structural component parts, for example, by generating a frictional connection. The spatial region 112 is further filled with a viscous medium, for example, oil or grease.

When a torque is transmitted, the shear keys 116 are acted upon in circumferential direction by the cylindrical portion 68. Through their interaction with the planet gear carrier portion 72 and the cover element 110 and with elastic configuration thereof they undergo a shear deformation and/or move in a sliding-frictional manner relative to these two structural component parts and accordingly generate a friction force so that the functionality of the frictional damping arrangement $R_2$ can also be fulfilled. Since this deformation movement or circumferential movement is carried out accompanied by displacement of the viscous medium contained in the receiving chamber 112, a fluidic damping action is also ensured in addition.

Figure 8:
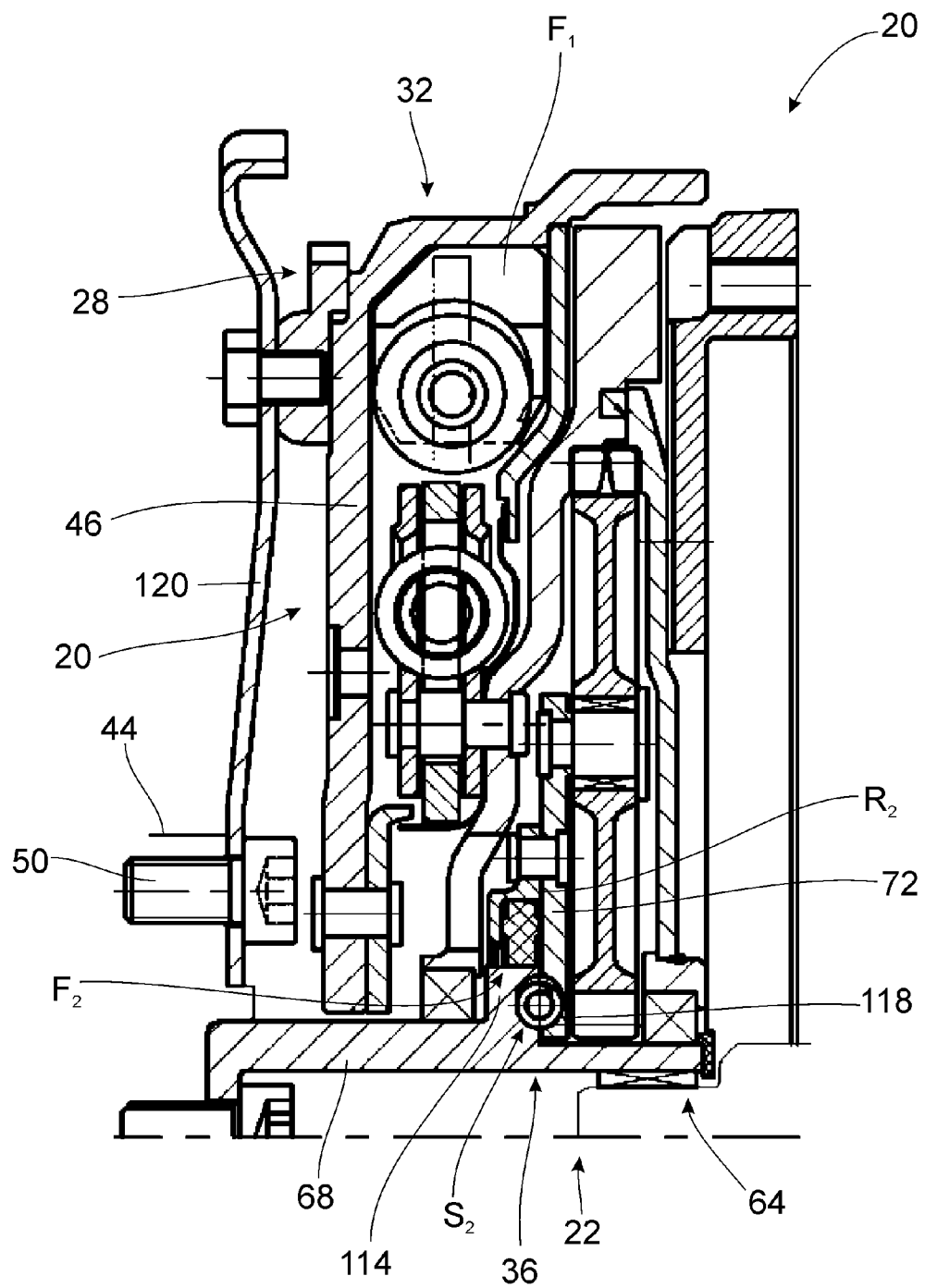
FIG. 8 is a view corresponding to FIG. 4 of an alternative embodiment.

In the embodiment shown in FIG. 8, a stiffness $S_2$ is additionally provided in the second torque transmission path 22 for forming a second oscillation system 36 with an appreciably lower resonant frequency. To this end, a spring arrangement 118, for example, with a plurality of springs disposed successively in circumferential direction, is arranged between the annular projection 114 of the cylindrical portion 68 and the radially inner region of the planet gear carrier portion 72 of the planet gear carrier 64. Acting in parallel with this are damping arrangements $R_2$ and $F_2$ which have already been described with reference to FIG. 9.

The resonant frequency or resonance of this second oscillation system 36 in the second torque transmission path 22 is tuned to the resonant frequency or resonance of the first oscillation system 32 in the first torque transmission path 20 in such a way that, with increasing speed and therefore also increasing excitation frequency and increasing frequency of the oscillation components contained in the torque, the oscillation system 32 first passes into the supercritical state, while oscillation system 36 still remains in the subcritical state. Accordingly, the phase shift described above will initially occur only in the first oscillation system 32, for example, already before reaching the idling speed or in the range of the idling speed. As the speed continues to increase, the above-mentioned superposition of the out-of-phase torque components takes place until the second oscillation system 36 also passes into its supercritical state, for example, in the range of the maximum attainable speed of the drive system, and the phase shift therefore also occurs in the second torque transmission path 22. As was already mentioned, the phase shift amounts to a maximum of 180°. However, its actual value depends on the occurring friction effects. By adjusting the frictionally and fluidically damping arrangements in the two torque transmission paths, the magnitude of the relative phase shift between the two torque transmission paths 20, 22 can accordingly be adjusted so that a superposition contributing to reduced oscillations can also be achieved in a condition in which both torque transmission paths 20, 22 and the oscillation systems 32, 36 arranged therein operate in the supercritical state.

It will further be seen in FIG. 8 that a flexplate, generally an axially elastic plate 120, is provided in the first torque transmission path 20. The primary side 28, i.e., the cover disk element 46 thereof, is connected by screw bolts 50 to the driveshaft 44 by means of this axially elastic plate 120. An axial decoupling of the first torque transmission path 20 from the driveshaft 44 with respect to vibrations is achieved in this way. In order also to achieve this in the second torque transmission path 22, for example, the planet gear carrier 64 which is constructed of multiple parts in any case could be axially elastic, for example, in the region of its planet gear carrier portion 72.

Figure 10:
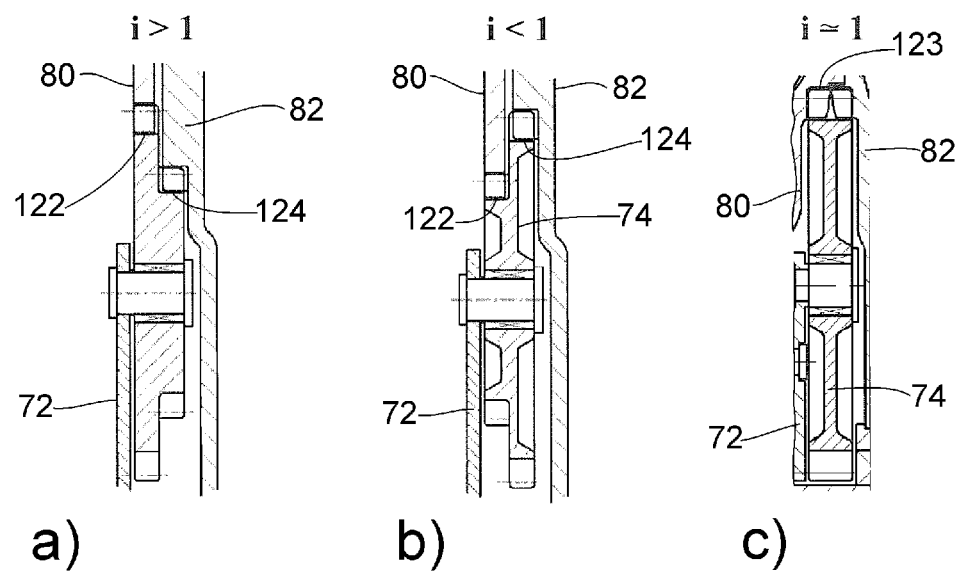
FIG. 10 is alternative embodiments of a planet gear with associated ring gears in views a), b) and c).

FIG. 10 shows specific embodiments of the planet gears 74 in views a), b) and c). Whereas in the embodiments described above these planet gears 74 are formed with an individual toothed region 123 (see also FIG. 10c) which cooperates with the drive-side ring gear 80 and with the driven-side ring gear 82 on the same radial level with respect to the axes of rotation of the planet gears 74, a stepped planet gear 74 is shown in FIG. 10a). This stepped planet gear 74 has a first toothed region 122 for cooperating with the drive-side ring gear 80 and a second toothed region 124 located farther radially inside for cooperating with the driven-side ring gear 82. In this case, a transmission ratio of i>1 is provided for the two toothed portions 122, 124 and accordingly also for the interaction with the two ring gears 80, 82. The torque components of the total torque to be transmitted which are transmitted via the two torque transmission paths 20, 22 can be adjusted in this way. In the embodiment example shown in FIG. 10a), the transmission ratio of i>1 makes it possible to transmit a proportion of the torque via each of the two torque transmission paths 20, 22 and to guide these two portions together again in the coupling arrangement 24. In the case shown in FIG. 10b), the transmission ratio i of the coupling arrangement 24 is less than 1. As a result, a torque reduction or reversal of the torque flow takes place in the second torque transmission path 22 accompanied by a strengthening of the torque transmitted to the first torque transmission path 20. The torque component conducted via the first torque transmission path 20 in this case is therefore strengthened relative to the introduced torque and is superposed in the coupling arrangement 24 with the torque transmitted in reverse direction in the second torque transmission path 22. A destructive superposition of oscillation components in the two torque transmission paths 20, 22 is also achieved in this way.

In the case where i=1, a division of the torque to be transmitted via the two torque transmission paths 20, 22 would not actually take place and, because of this, a damping functionality initiated by the superposition of phase-shifted oscillation components can also not be achieved. In fact, in a configuration of this kind, the torque transmitted via the second torque transmission path would equal zero. In order nevertheless to achieve a transmission ratio differing from 1 but still close to 1 in the embodiment shown in FIG. 10c) in which the planet gears 74 are configured as standard spur gears, i.e., with an outer circumferential toothing 123 lying on the same radial level for the two ring gears 80, 82, the two ring gears 80, 82 can be constructed with profile displacements differing from one another. This simplifies construction in general, particularly in the region of the planet gears 74, but allows a transmission ratio other than 1 to be provided and therefore permits the transmission of a part of the torque via the second torque transmission path.

Figure 11:
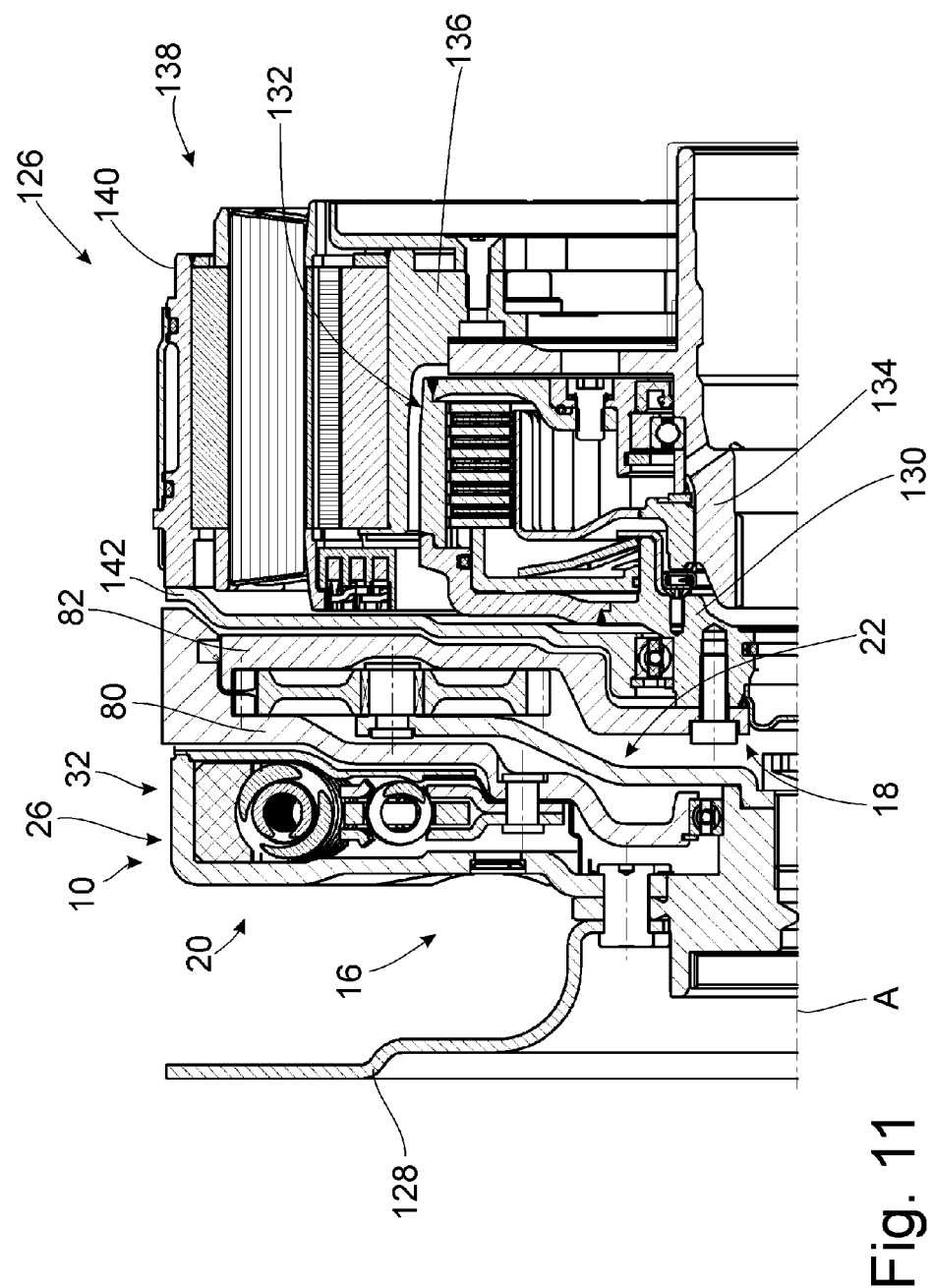
FIG. 11 is a hybrid drive module with a torsional vibration damping arrangement with two parallel torque transmission paths.

FIG. 11 shows the use of a torsional vibration damping arrangement 10 constructed according to the invention in a hybrid drive module 126. The input region 16 of the torsional vibration damping arrangement 10 is to be connected to a driveshaft, for example, the crankshaft of an internal combustion engine, via a coupling plate 128 and a flexplate or the like, not shown in FIG. 11, to be connected to this coupling plate 128. The output region 18, in this case substantially provided by the driven-side ring gear 82, is fixedly connected to the housing 130 of a wet multi-disk clutch 132 by screwing. A driven element 134 of the wet multi-disk clutch is to be coupled with a driven shaft, not shown, for example, a transmission input shaft, so as to be fixed with respect to rotation relative to it. Further, the rotor 136 of an electric machine 138 is coupled to the driven element 134 for common rotation. A stator arrangement 140 of the electric machine 138 is carried, for example, by a carrier element 142 which provides a bearing support of the housing 130 of the wet multi-disk clutch 132.

The torsional vibration damping arrangement 10 shown in FIG. 11 corresponds to the embodiment shown in FIG. 4 with respect to its basic construction. Of course, the other torsional vibration damping arrangements which have been described above and also those which have been modified in various areas could also be used in this case. Also the hybrid drive module 126 could also be constructed differently than shown in FIG. 11 as regards the construction of the wet multi-disk clutch 132 and electric machine 138.

Figure 12:
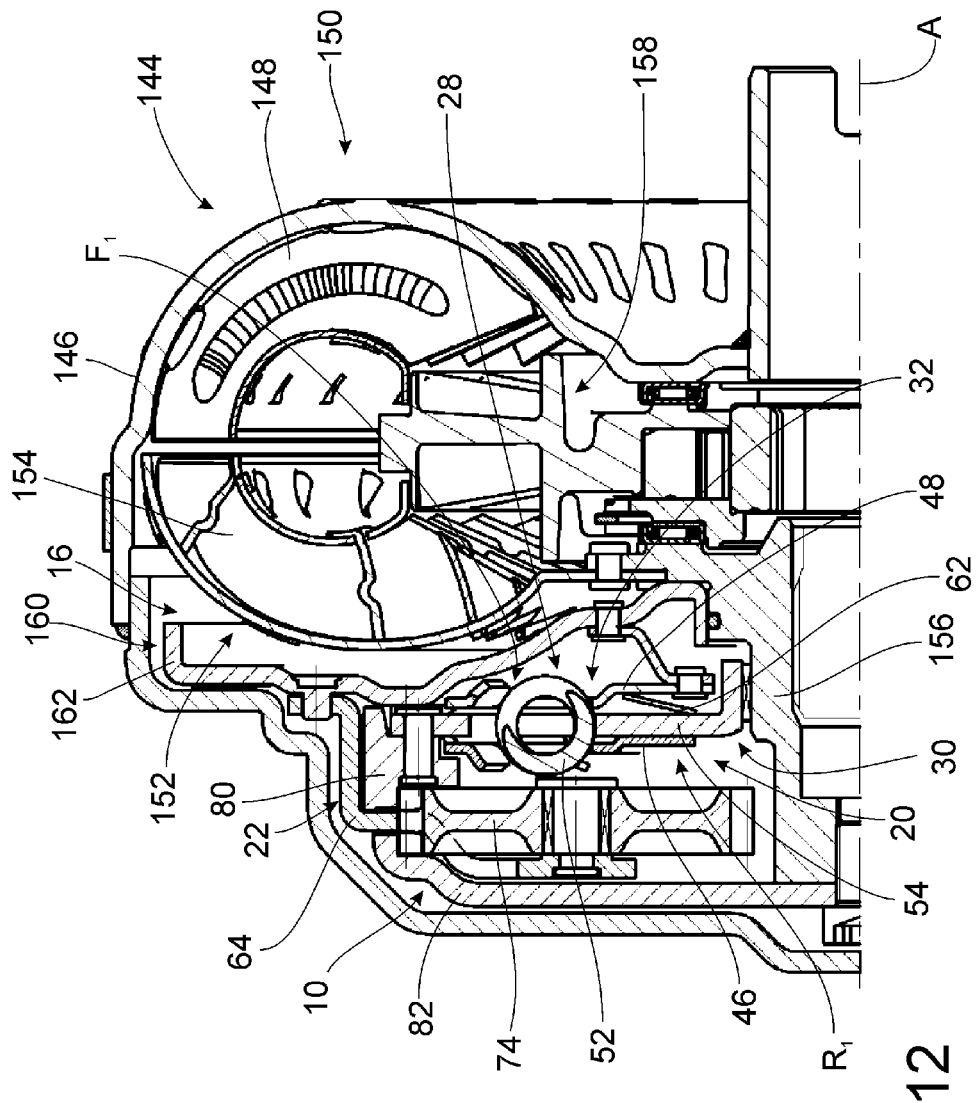
FIG. 12 is a hydrodynamic torque converter with a torsional vibration damping arrangement with two parallel torque transmission paths.

FIG. 12 shows the integration of a torsional vibration damping arrangement 10 according to the invention in a hydrodynamic torque converter 144. The latter has a converter housing 146 which is filled or fellable with fluid and, supported at an inner side thereof, a plurality of impeller blades 148 for providing an impeller 150. A turbine 152 with turbine blades 154 axially opposed to the impeller blades 148 is arranged in the converter housing 146. The turbine 152 is to be coupled with a driven shaft, not shown, for example, a transmission input shaft, by a turbine hub 156. A stator, designated generally by 158, is arranged between the turbine 152 and the impeller 150 and is carried on a hollow supporting shaft, not shown, via a freewheel arrangement so as to be rotatable in a direction around the axis of rotation A.

A lockup clutch 160 comprises a clutch piston 162 which can be brought into and out of frictional engagement with the converter housing 146 depending on pressure conditions in the interior of this converter housing 146. The clutch piston 162 substantially also forms the input region 16 of the torsional vibration damping arrangement 10. The planet gear carrier 64 is coupled in its radially outer region with the clutch piston 162 for common rotation around the axis of rotation A; however, the clutch piston 162 is movable axially relative to the planet gear carrier 64 to allow engagement and disengagement. In its radially inner region, the planet gear carrier 64 carries the planet gears 74. In their radially outer region, these planet gears 74 are in meshing engagement with the drive-side ring gear 80 and in the driven-side ring gear 82 which is in turn connected, e.g., screwed, in its radially inner region to the turbine hub 156 so as to be fixed with respect to rotation relative to it.

In this embodiment, the first torque transmission path 20 also again comprises the first oscillation system 32 with the spring arrangement 52, a primary side 28 comprising the two cover disks 46, 48, and a secondary side 30 comprising the central disk element 54. The central disk element 54 is rotatably bearing-supported in its radially inner region on the turbine hub 156 and is fixedly connected, e.g., riveted, in its radially outer region to the drive-side ring gear 80. A preloading element 62 acting between the cover disk element 48 and the central disk element 54 presses the central disk element 54 axially against the radially inner region of the cover disk element 46 so that a frictional damping arrangement $R_1$ is provided in this case.

Given the fact that the converter housing 146 is generally completely filled with oil, the primary side 28 and secondary side 30 of the oscillation system 32 move relative to one another in a viscous medium, namely, the oil, when rotational irregularities occur so that the fluidic damping arrangement $F_1$ is also realized in this way.

As a result of the branching into the first torque transmission path 20 and second torque transmission path 22, it can be brought about that in the engaged state of the lockup clutch 160 rotational irregularities generated particularly by the internal combustion engine are not transmitted via the hydrodynamic torque converter 144 and therefore relayed into the further drivetrain or, if so, only in a damped manner.

Possible embodiments of a torsional vibration damping arrangement 10 constructed according to the invention will be described in the following referring to various schematic views.

Figure 13:
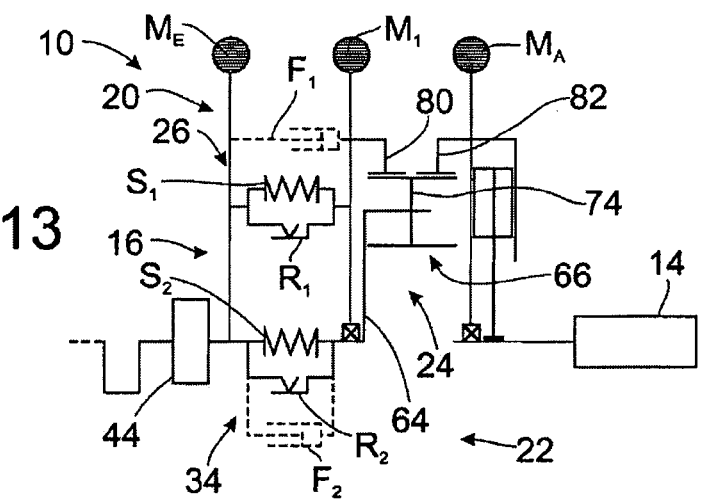
FIG. 13 is another schematic view of a torsional vibration damping arrangement with two parallel torque transmission paths.

FIG. 13 basically shows a construction such as that described above referring to FIG. 1. A stiffness $S_1$ and $S_2$, respectively, and connected in parallel thereto a frictional damping arrangement $R_1$, $R_2$ and a fluidic damping arrangement $F_1$, $F_2$, respectively, is provided in each torque transmission path 20, 22. The two stiffnesses $S_1$ and $S_2$ and the oscillation systems formed therewith have natural frequencies which differ from one another for providing the phase difference.

Figure 14:
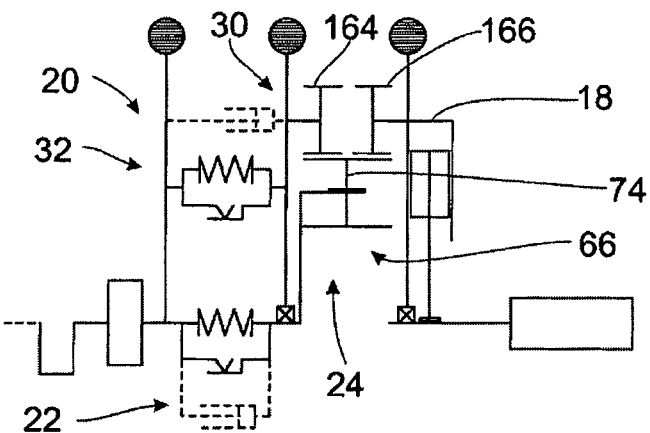
FIG. 14 is a view corresponding to FIG. 13 of an alternative embodiment.

FIG. 14 shows an embodiment in which the planet gears 74 of the planetary transmission arrangement 64 acting as coupling arrangement 24 cooperate radially outwardly not with ring gears 80, 82 but with drive-side spur gears 164 and driven-side spur gears 166 which are arranged so as to be distributed over the circumference. They are held at the secondary side 30 of the first oscillation system 32 on one hand and at the output region 18 on the other hand so as to be fixed with respect to relative rotation and accordingly cooperate with the two planet gears 74 for torque transmission and support.

Figure 15:
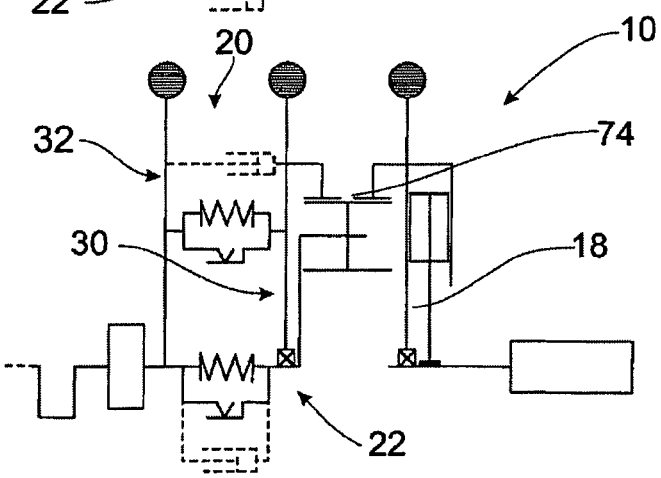
FIG. 15 is a view corresponding to FIG. 13 of an alternative embodiment.

In the embodiment shown in FIG. 15, the spur gears provided at the secondary side 30 of the first oscillation system 32 and at the output region 18 of the torsional vibration damping arrangement 10, respectively, are arranged at the radial inner side of the planet gears 74.

Figure 16:
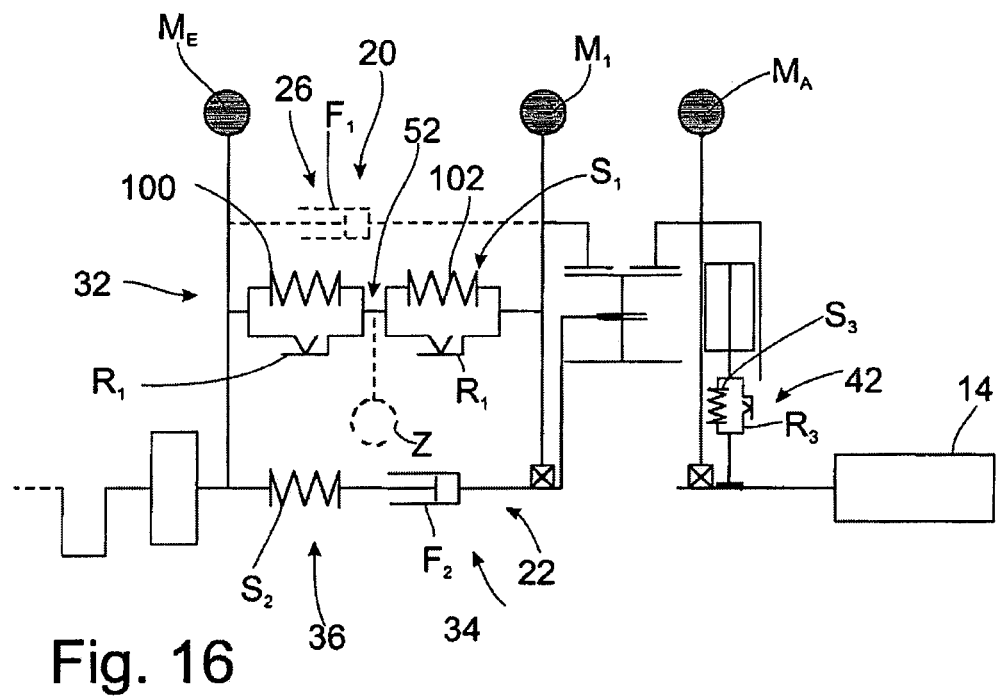
FIG. 16 is a view corresponding to FIG. 13 of an alternative embodiment.

FIG. 16 illustrates a construction similar to that in FIG. 7. The spring arrangement 52 of stiffness $S_1$ of the phase shifter arrangement 26 in this case comprises two spring sets 102 acting in series and a frictional damping arrangement $R_1$ parallel thereto. A fluidic damping arrangement $F_2$ acts parallel to the entire spring arrangement 52 and stiffness $S_1$. An intermediate mass Z is formed between the two spring sets 100, 102 particularly by means of the structural component parts coupling the latter for torque transmission. The second torque transmission path 22 comprises in series to stiffness $S_2$ a fluidic damping arrangement $F_1$. Further, the third stiffness $S_3$ arranged, for example, in the region of a clutch disk has a frictional damping arrangement $R_3$ in parallel to it.

Figure 17:
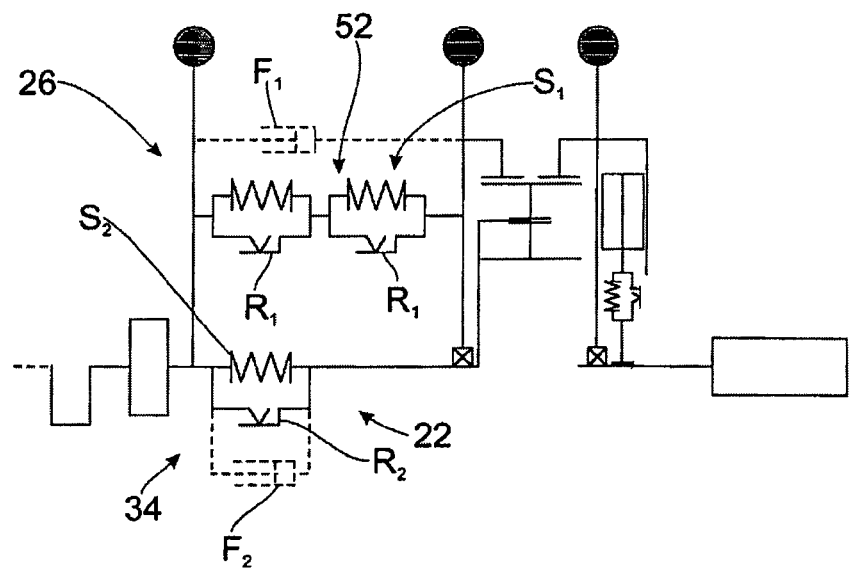
FIG. 17 is a view corresponding to FIG. 13 of an alternative embodiment.

In the modification shown in FIG. 17 which is based generally on the construction shown in FIG. 16, a frictional damping arrangement $R_2$ and a fluidic damping arrangement $F_2$ are provided in the second torque transmission path 22 parallel to stiffness $S_2$.

Figure 18:
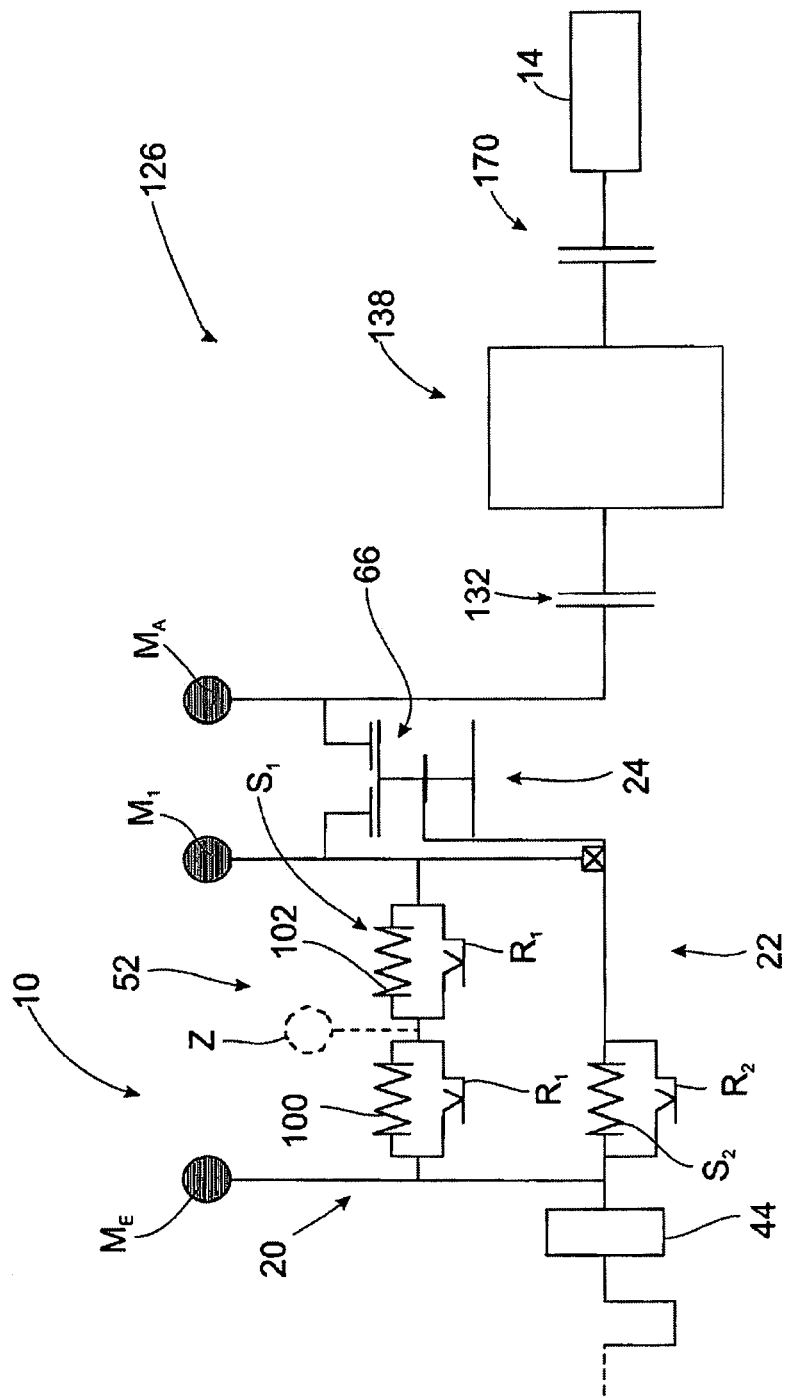
FIG. 18 is a view corresponding to FIG. 13 of an alternative embodiment.

FIG. 18 illustrates the integration of a torsional vibration damping arrangement 10 with the two torque transmission paths 20, 22 in a hybrid drive module 126. In the first torque transmission path 20, the first stiffness $S_1$ again comprises the two spring sets 100, 102 of the spring arrangement 52 which act in series and a frictional damping arrangement $R_1$ parallel thereto. In the second torque transmission path, a frictional damping arrangement $R_2$ acts parallel to stiffness $S_2$. A clutch shown schematically, for example, in the form of the wet multi-disk clutch 132, implements a decoupling/coupling of a drive unit, for example, an internal combustion engine, and therefore also the torsional vibration damping arrangement 10 from/to the subsequent part of the drivetrain and therefore particularly also the electric machine 138. Following the electric machine 138, the torque flow can be interrupted by a further clutch 170 acting as starting element, for example, to carry out shifting processes in the transmission 14.

Figure 19:
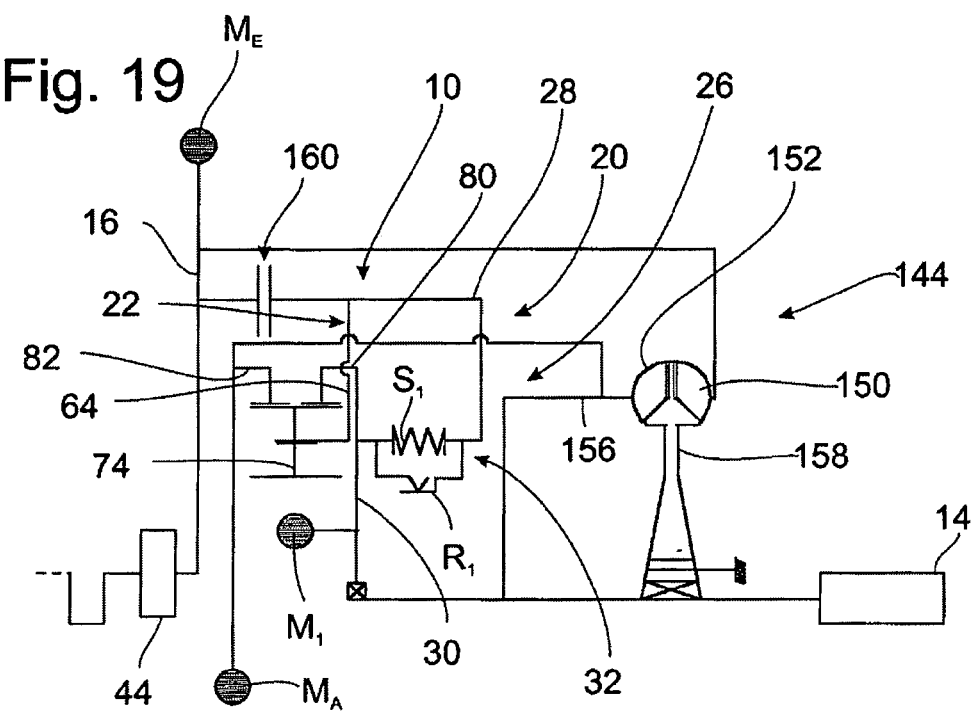
FIG. 19 is a view corresponding to FIG. 13 of an alternative embodiment.

FIG. 19 schematically illustrates the integration of the torsional vibration damping arrangement 10 in a hydrodynamic torque converter 144. The dividing of the torque transmission into the two torque transmission paths 20 and 22 following the lockup clutch 160 is clearly shown. The first phase shifter 26 with its first stiffness $S_1$ and oscillation system 32, respectively, is arranged in torque transmission path 20. The planet gear carrier 64 with its planet gears 74 rotatably carried thereon is situated in the second torque transmission path 20. These planet gears 74 are in meshing engagement with the drive-side ring gear 80 connected to the secondary side 30 of the oscillation system 32 and the driven-side ring gear 82 connected to the turbine hub 156. As in the construction shown in FIG. 12, the torsional vibration damping arrangement 10 is also basically only operative in this case when the lockup clutch 160 is in an engaged state.

Figure 20:
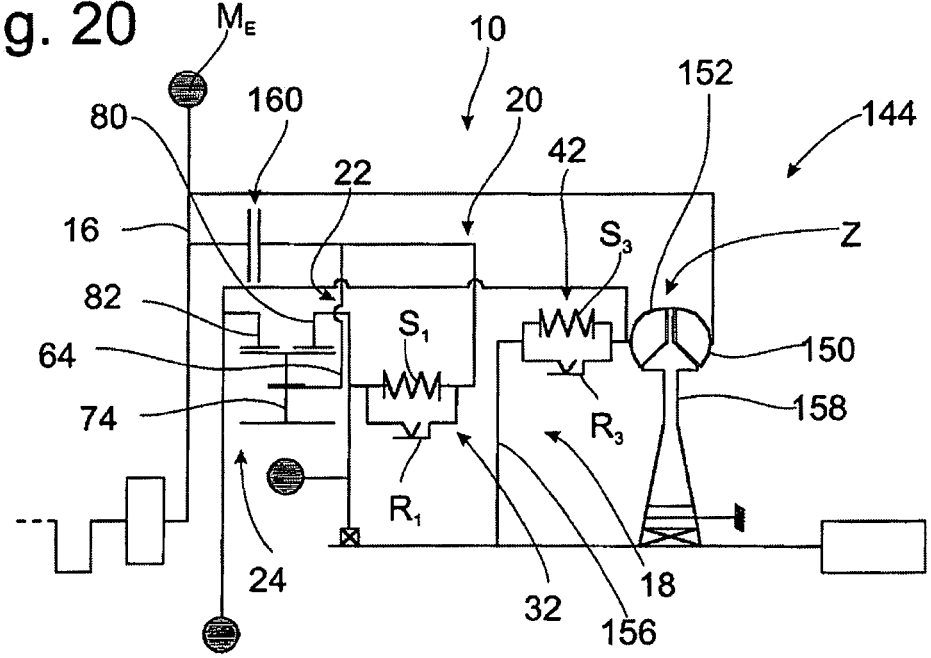
FIG. 20 is a view corresponding to FIG. 13 of an alternative embodiment.

In the construction shown in FIG. 20, in addition to oscillation system 32 in the first torque transmission path 20 and in the torque flow following the coupling arrangement 24, a third oscillation system 42 is operative in the output region 18 with a third stiffness $S_3$ and, parallel thereto, a frictional damping arrangement $R_3$. Between the two oscillation systems 32, 42, the turbine 152 forms an intermediate mass Z which has advantageous results for vibration damping in the engaged state of the lockup clutch 160. Further, the third oscillation system 42 is also operative when lockup clutch 160 is disengaged, i.e., when torque is transmitted from the impeller 150 via the turbine 152 to the turbine hub 156.

Figure 21:
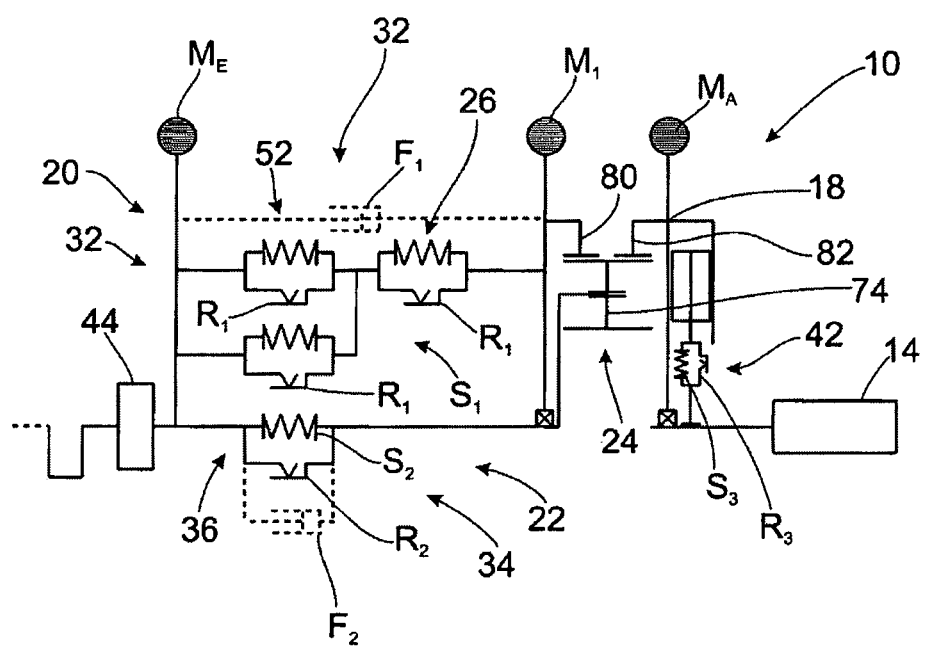
FIG. 21 is a view corresponding to FIG. 13 of an alternative embodiment.

FIG. 21 shows a torsional vibration damping arrangement 10 in which the oscillation system 32 provided in the first torque transmission path 20 comprises a total of three stiffnesses $S_1$. Two of these stiffnesses $S_1$ are connected in series with one another. A third stiffness $S_1$ is connected in parallel to the first of the two stiffnesses $S_1$ that are connected in series. A frictional damping arrangement $R_1$ is connected in parallel to each of the three stiffnesses $S_1$. Further, a fluidic damping arrangement $F_1$ acts in the oscillation system 32 parallel to stiffnesses $S_1$. An oscillation system 36 with a stiffness $S_2$ and with a frictional damping arrangement $R_2$ and fluidic damping arrangement $F_2$ parallel thereto is provided in the second torque transmission path 22.

It should be emphasized once again with reference to FIG. 21 that each of the stiffnesses $S_1$ and $S_2$ and the stiffness $S_3$ integrated in a clutch disk of a friction coupling can comprise spring arrangements with a plurality of springs, particularly helical compression springs, in series and/or nested one inside the other.

FIG. 22 shows a table containing various quantities or ratios thereof such as can be provided in a torsional vibration damping arrangement 10 according to the invention. Each of the values or each ratio indicated in Table 1 can be realized with the respectively assigned numerical value or range of numerical values individually or in combination with any other value or values in any of the torsional vibration damping arrangements described above.

In explanation of Table 1 "min" designates a minimum value and "max" designates a maximum value for a particular quantity, for example, the mass moment of inertia $M_E$ assigned to the input region. The optimum value for this mass moment of inertia $M_E$ of the input region lies, for example, between 0.05 kgm² and 2 kgm² as can be seen from lines 1 and 2 of Table 1.

Further, it has been shown that the ratio d of the mass moment of inertia $M_E$ of input region 16 and of the primary side 28, respectively, to the mass moment of inertia $M_1$, i.e., the secondary-side mass moment of inertia, in the first torque transmission path 20, should advantageously lie in a range from 1 to 10. A ratio e of the secondary-side mass moment of inertia $M_1$ of the first torque transmission path to a mass moment of inertia $M_2$ in the second torque transmission path, possibly also in this case the secondary-side mass moment of inertia or total mass moment of inertia when there is no elasticity present, should advantageously lie in the range between 2 and 20.

It has further been shown that stiffness $S_2$ in the second torque transmission path 22 should advantageously be above 800 Nm/°, most preferably above 1500 Nm/°. This leads to a very stiff second torque transmission path 22 which substantially does not permit torsional vibrations so that natural oscillations of this torque transmission path are substantially prevented in the occurring frequency range and excitation range. Accordingly a phase difference induced by vibrational excitation occurs substantially only in the first torque transmission path. It should be emphasized once again that, of course, the oscillation behavior of the second torque transmission path 22 can also be influenced by providing a frictional damping arrangement or fluidic damping arrangement and can accordingly be maintained in an optimum range in conformity with the oscillation behavior of the first torque transmission path.

With respect to the different stiffnesses or spring stiffnesses in the two torque transmission paths 20, 22, it should be stated that the stiffness or total stiffness in the first torque transmission path 20 which can be regarded as the main branch of torque transmission is preferably selected in such a way that a low tuning is achieved. This means that the natural frequency of the oscillation system in the first torque transmission path 20 lies in a speed range below the operating speed range occurring in normal operation, which is generally between idling speed and a maximum speed that can be supplied by a drive unit. The stiffnesses can be configured in one or more stages and, for example, permit a maximum twist angle of about 80° between the primary side and secondary side.

The stiffness in the second torque transmission path 22, which can be regarded as the superposition branch, is preferably selected in such a way that a high tuning is achieved. This means that the natural frequency of the oscillation system in the second torque transmission path should be above the operating speed range. This means that in normal operation a transition of the oscillation system in the second torque transmission path 22 into a supercritical state does not occur.

The fluidic damping or viscous damping in the first torque transmission path 20, i.e., in the main branch of torque transmission, is preferably selected as a function of different further operating variables or parameters, and it can be provided that the natural frequency or resonant frequency that can be attained in the first torque transmission path lies below idling speed, and the reduction of rotational irregularities is favorably influenced in this way.

In the second torque transmission path 22, i.e., the superposition branch, the fluidic damping can likewise be adjusted as a function of further operating variables or parameters, preferably in such a way that the natural frequency in this case lies above the maximum attainable speed, i.e., outside the operating speed range, and accordingly can likewise advantageously influence the reduction of rotational irregularities.

With respect to the frictional damping, the friction coefficient in the first torque transmission path 20, i.e., in the main branch, can be selected, for example, by means of various structural measures, in such a way that it lies as close as possible to the optimum value of 0 Nm. Particularly low-friction connections or couplings of the various interacting elements can be selected for this purpose. In particular, the friction, which can never be completely eliminated for reasons inherent to the system, can be reduced as far as possible through the selection of very low-friction or friction-reducing materials. The lower the friction in the first torque transmission path 20, the closer the phase shift that can be achieved when transitioning into the supercritical state moves toward the maximum value of 180°.

With regard to the coupling arrangement which can be constructed, as shown above, with two ring gears, namely a first ring gear in the first torque transmission path 20 and a second ring gear at the output, and planet gears in the second torque transmission path 22, the distribution or quantity of the torque to be conducted via the first torque transmission path 20 is influenced by adjusting the transmission ratio, for example, in a range between 0.5 and 2. It has been shown in this respect that an optimal value of the transmission ratio or distribution ratio can be between 0.7 and 1.3.

Figure 23:
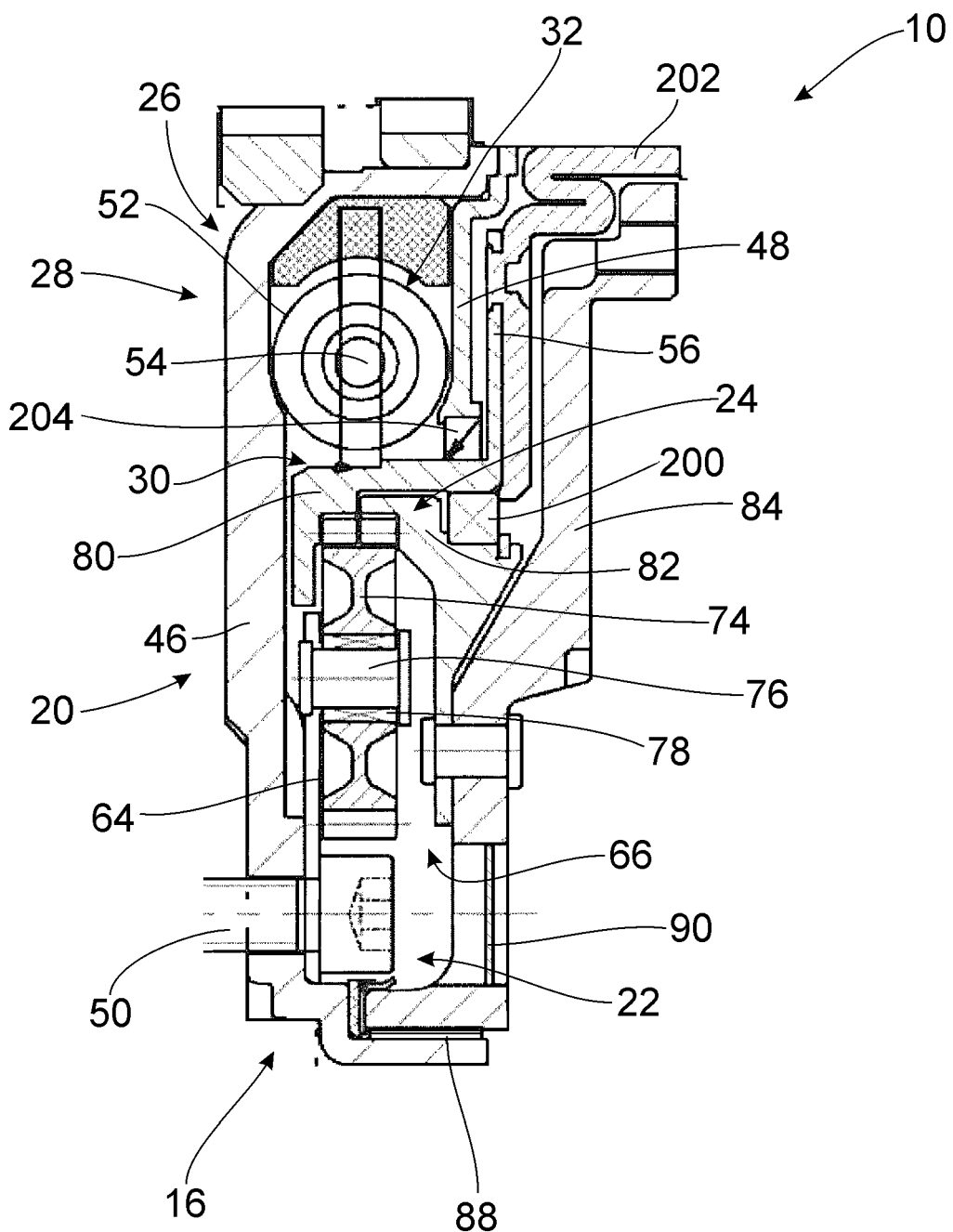
FIG. 23 is a fragmentary longitudinal sectional view of an alternative embodiment of a torsional vibration damping arrangement.

FIG. 23 shows another alternative embodiment of a torsional vibration damping arrangement 10 which corresponds to that shown in FIG. 4 as regards basic construction. However, whereas in the embodiment shown in FIG. 4 the phase shifter arrangement 26 provided in the first torque transmission path 20 and the coupling arrangement 24 comprising the planetary transmission arrangement 66 are arranged axially successively, i.e., next to one another, and the planet gears 74 extend radially outward up to the region of the damper springs 52, the coupling arrangement 24 in the embodiment shown in FIG. 23, i.e., substantially the planetary transmission arrangement 66 with its planet gears 74 and the two ring gears 80, 82, lies radially inside the phase shifter arrangement 26 and substantially completely overlaps the latter axially. Accordingly, a very axially compact construction with efficient use of the radially inner installation space is achieved in this case.

It will be seen in FIG. 23 that the disk-like planet gear carrier 64 together with the cover disk element 46 of the first torque transmission path 20 is fixed to a driveshaft or the like by screw bolts 50. In order to obtain access to these screw bolts, a plurality of through-holes which are closed by closure caps 90 are provided radially inwardly in the annular friction surface element 84 which also acts as flywheel mass. The friction surface element 84 is fixedly connected, e.g., riveted, to the ring gear 82 and is rotatably supported radially inwardly by means of a bearing 88 on an axially extending projection of the cover disk element 46 and is also axially supported thereon. In its radially outer region, the driven-side ring gear 82 is rotatably supported by means of a further bearing 200 with respect to the drive-side ring gear 80 which axially overlaps the driven-side ring gear 82. A supplementary mass 202 which increases the secondary-side mass of the phase shifter arrangement 26 can be fixed, e.g., riveted, to a radially outwardly extending portion of the drive-side ring gear 80.

The central disk element 54 of the phase shifter arrangement 26 is arranged on an outer circumferential area of the drive-side ring gear 80 and connected thereto so as to be fixed with respect to rotation relative to it. This can be carried out by means of an interference fit, a positive connection (spline teeth or the like) or frictional connection. It is also possible to connect the central disk element 54 to the drive-side ring gear 80 by welding.

In a region radially outside of the bearing 200, the drive-side ring gear 80 is closed so as to be fluid-tight with respect to the cover disk element 48 by a seal element 204 so that a tight closure can be achieved for the volume region receiving the damper springs 52 of the oscillation system 32.

In this volume region, a (low-viscosity or high-viscosity) fluid, a friction lubricant or another viscous medium can be provided so that the functionality of a fluidic damping can also be achieved simultaneously during relative rotation of the primary side 28 with respect to the secondary side 30.

The bearings used in the different areas can, of course, also be constructed as plain bearings or as rolling element bearings. When constructed as rolling element bearings, they can preferably be enclosed so that a fluid-tight closure can also be achieved simultaneously at those locations where respective bearing points are formed, i.e., for example, also in the region of bearings 88 and 200.

Figure 24:
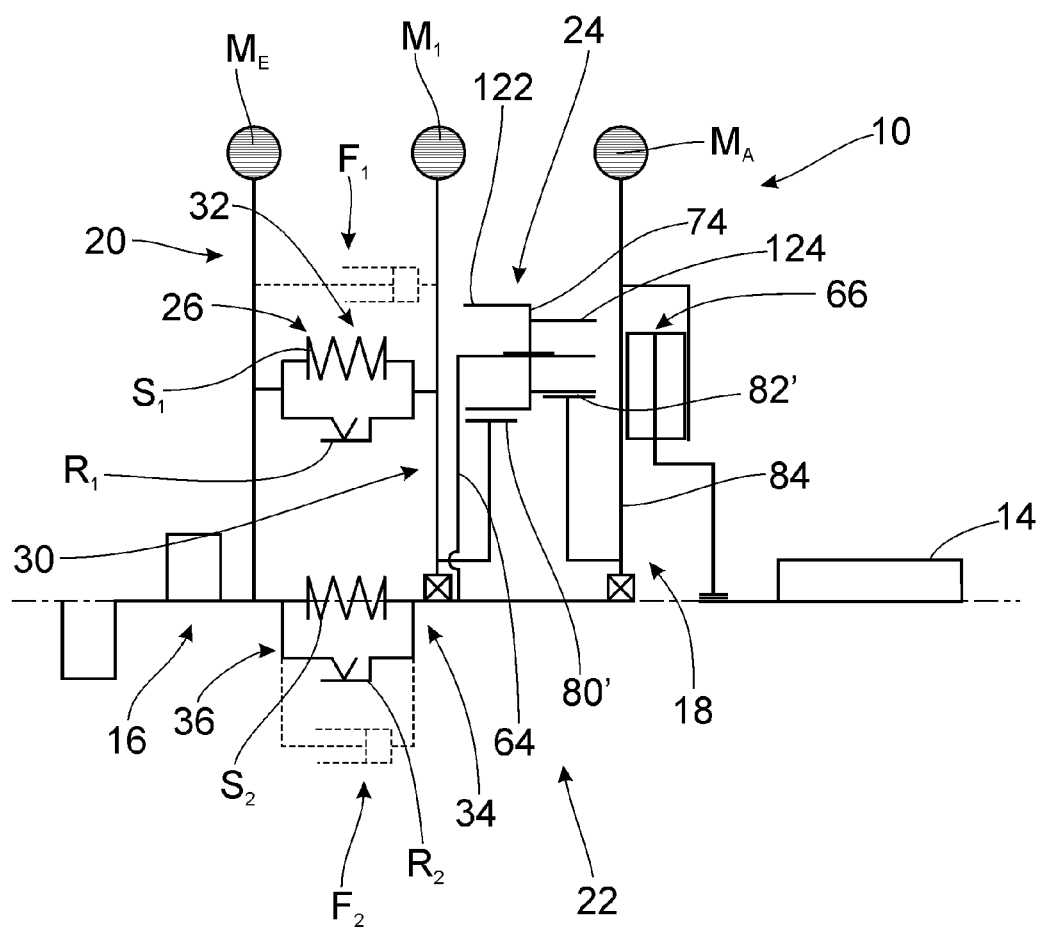
FIG. 24 is a schematic view of a torsional vibration damping system with a coupling arrangement constructed with sun gear arrangements.

FIG. 24 shows an embodiment of a torsional vibration damping arrangement 10 in which respective phase shifter arrangements 26, 34 with oscillation systems 32, 36 are again provided, for example, in the two torque transmission paths 20 and 22. Of course, a phase shifter arrangement 26 could also be provided only in the first torque transmission path 20, while the second torque transmission path 22 can be configured so as to be comparatively stiff.

The planet gear carrier 64 with the planet gears 74 disposed thereon so as to be distributed in circumferential direction, in this case with teeth 122, 124 having different diameters, is provided in the second torque transmission path 22. In this embodiment, the coupling arrangement 24 and planetary transmission arrangement 66 have sun gears 80' and 82' cooperating with the planet gears 74. A drive-side sun gear 80' coupled to the secondary side 30 of the oscillation system 32 is in meshing engagement with teeth 122, while a driven-side sun gear 82' which is coupled, for example, to a friction surface element 84 of a friction coupling or to the output region 18 is in meshing engagement with teeth 124 of planet gears 74.

Providing a planetary transmission arrangement 66 with a drive-side sun gear 80' and a driven-side sun gear 82' helps above all to make use of the radially inner installation space.

Figure 25:
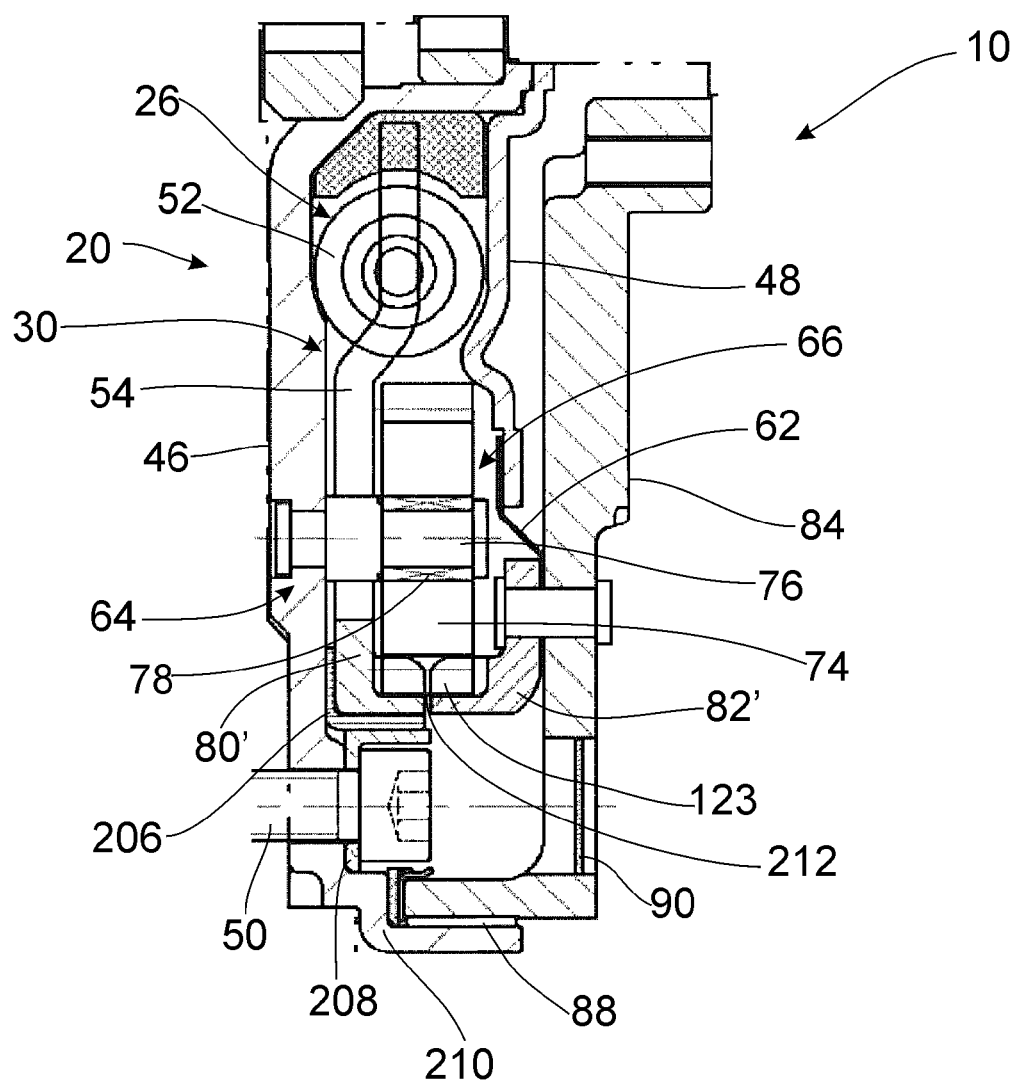
FIG. 25 is a fragmentary longitudinal sectional view of a torsional vibration damping arrangement with sun gear arrangements.

An embodiment of a torsional vibration damping arrangement 10 of this kind is shown in FIG. 25. It will be seen that the secondary-side central disk element 54 extends farther radially inward, radially inwardly overlaps the support pins 76 of the planet gears 74, and provides the drive-side sun gear 80' at that location. In order to allow a circumferential relative movement between this sun gear 80', i.e., the central disk element 54', and the support pin 76, the cover disk element 54 has corresponding circumferential recesses in the radial region of these support pins 76.

The driven-side sun gear 82' is fixedly connected, e.g., riveted, to the friction surface element 84. Together with the drive-side sun gear 80', it is in meshing engagement with the teeth 123—which are not stepped in this case—of the planet gears 74 which are arranged so as to be distributed in circumferential direction. A transmission ratio different than 1 can also be achieved in this case, for example, by different profile displacements of the teeth of the sun gears 80' and 82'.

With its radially inner region, the cover disk element 46 to be connected to a driveshaft or the like by the screw bolts 50 likewise forms the planet gear carrier 64 in which the support pins 76 are fixed by riveting or the like. The central disk element 54 or drive-side sun gear 80' formed integral therewith is supported axially with respect to the cover disk element 46 and radially at a supporting element 208 which is annular, for example, and which is secured by the screw bolts 50 by a bearing 206 which is constructed, for example, as a plain bearing support. The driven-side sun gear 82' is axially and radially supported with respect to the cover disk element 46 by means of the friction surface element 84 by the radial bearing 88 and, for example, an axial bearing 210.

A fluid-tight closure of the volume region containing the damper springs 52 can be achieved by a pre-loading element 62 which is constructed as a sheet metal element installed in a pre-loaded manner and which can be fixed together with the sun gear 82' to the friction surface element 84 and which is supported radially outwardly at the cover disk element 48. Axially between the two sun gears 80' and 82', a further seal element 212 can tightly seal this volume region radially inwardly.

Of course, in this embodiment the drive-side sun gear 80' can also be formed separate from the secondary side 30 and central disk element 54 and can therefore be fixedly connected, for example, by riveting, welding or screwing. Similarly, the driven-side sun gear 82' could of course be formed integral with the friction surface element 84' or another flywheel mass element.

In this embodiment, as in the embodiments having ring gears, the teeth provided at the sun gears or ring gears can be formed as straight teeth or as inclined teeth. Particularly at those locations where stepped planet gears 74 are used which have two sets of teeth 122, 124, different toothing geometries can also be used, of course, in association with the drive-side ring gear or sun gear and in association with the driven-side ring gear or sun gear.

Figure 26:
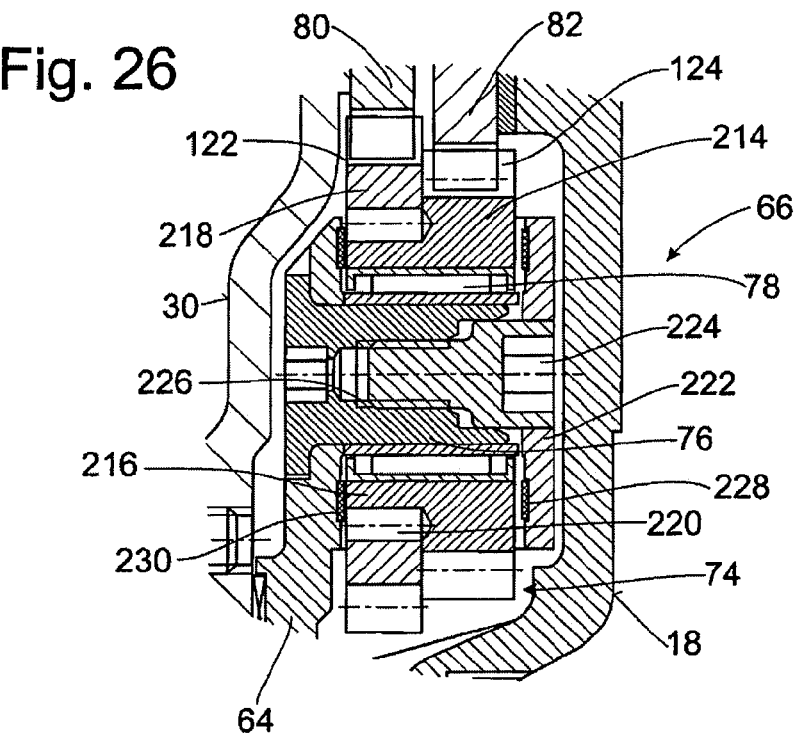
FIG. 26 is a detailed view of a planet gear which is rotatably supported at a planet gear carrier.
Figure 27:
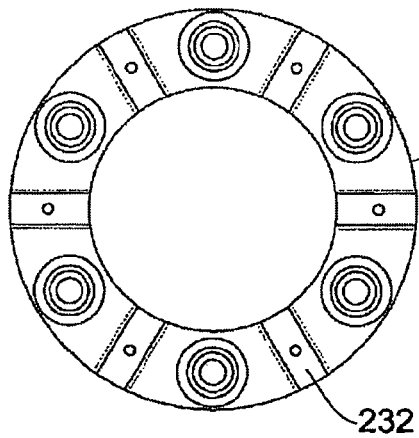
FIG. 27 is a supporting ring for stabilizing the planet gears carried at the planet gear carrier in axial view.
Figure 28:
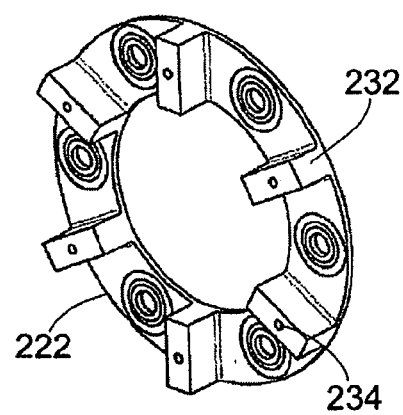
FIG. 28 shows the supporting ring from FIG. 27 in perspective view.

FIGS. 26 to 28 show the construction of a planet gear carrier which can be used in the different embodiment of the planetary transmission arrangement 66 that were described above. FIG. 26 shows the planet gear carrier 64 with a planet gear 74 rotatably carried thereon. This planet gear 74 is formed in two-stepped manner with teeth 122, 124 of different diameters. The planet gear 74 is formed of two parts; a cylindrical axial projection 216 carrying the gear part 218 having teeth 122 is provided at the gear part 214 having teeth 124. These two gear parts 214, 218 are fixedly connected to one another, particularly so as to be fixed with respect to relative rotation, by retaining pins 220.

A supporting ring 222 is fixed to the axial ends of the support pins 76 remote of the planet gear carrier 64 by screw bolts 224 or the like which are screwed into threaded holes 226 of the support pins 76. The supporting ring 222 accordingly connects preferably all of the support pins 76 so that they are secured against deflecting movements in circumferential direction or in radial direction under load. This results in a stiffening of the planetary transmission arrangement 66 in the region of the planet gear carrier 64. As a result, the different teeth in meshing engagement are held in an optimal manner with respect to their toothed engagement and, therefore, wear-inducing friction effects can be mitigated or eliminated. Further, by virtue of the mitigation or elimination of friction effects, a disadvantageous influence on the vibration damping behavior is prevented.

It will further be seen in FIG. 26 that thrust rings 228, 230 at which the planet gears 74 can be supported axially and which surround the support pins 76 can be provided at the mutually opposing sides of the supporting ring 22 on the one hand and of the planet gear carrier 64 on the other hand. Further, the supporting ring 222 can be provided with axial webs 232 in regions thereof lying between successive planet gears 74 in circumferential direction, which axial webs 232 extend into the circumferential region between the planet gears 74 and can reach to the planet gear carrier 64. Fastening members can then be inserted through the planet gear carrier 64 in openings 234 of these webs 232 so that a greater stability can be achieved in the connection of the supporting ring 222.

Figure 29:
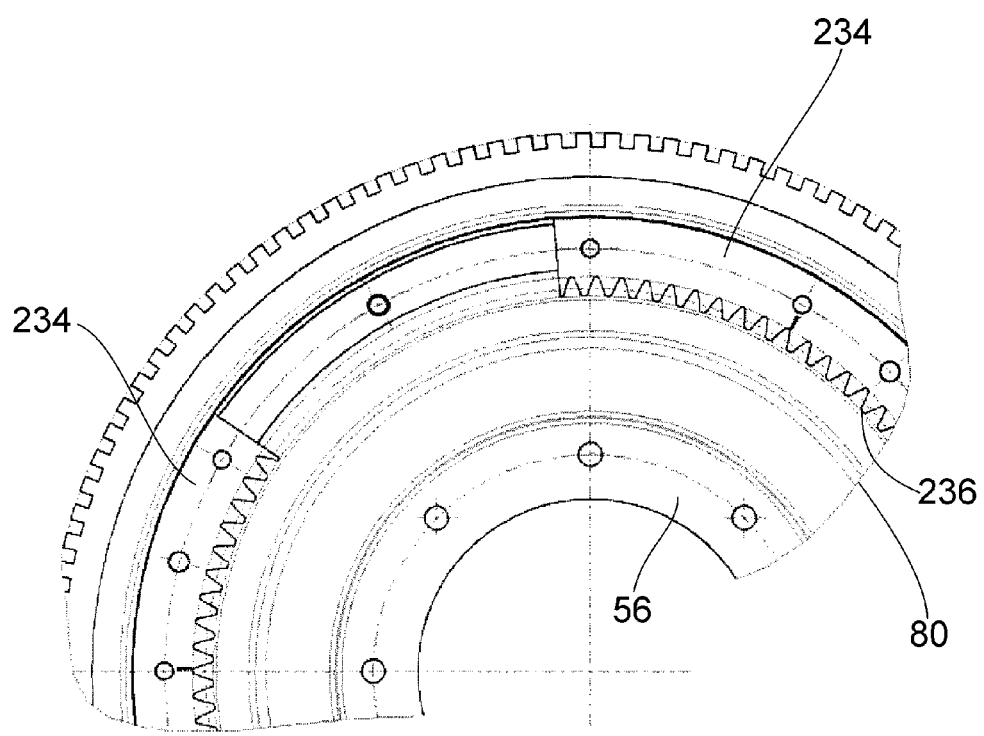
FIG. 29 is a fragmentary axial view of a ring gear arrangement formed with ring gear segments.

Referring to the example of a drive-side ring gear 80, FIG. 29 shows the construction thereof with a plurality of ring gear segments 234 distributed in circumferential direction. These ring gear segments 234 are fixed to an annular structural component part, for example, the secondary-side mass part 56 shown in FIG. 4, by screwing and/or welding and/or other fastening means, e.g., fastening pins or the like. The ring gear segments 234 which provide the teeth 236 cooperating with the planet gears 74 are positioned at those circumferential regions at which the planet gears 74 are also positioned. The circumferential extension of the ring gear segments 234 can be limited to the circumferential regions in which the drive-side ring gear 80 and the planet gears 74 move with respect to one another in circumferential direction.

Construction of the drive-side ring gear 80 with ring gear segments of this kind offers various advantages. For example, it is possible to use materials which are optimized for the given requirements. In particular, the ring gear segments 234 can be formed of comparatively hard and therefore wear-resistant material. Also, the drive-side ring gear 80 can be composed, for example, of a disk-like structural component part and the individual ring gear segments in a comparatively simple manner. Teeth need no longer be worked into a larger disk-like structural component part. It is also possible therefore to provide ring gear segments with differing profile displacement of the teeth 236 formed thereon, which makes it possible to adjust the gear ratio provided in the coupling arrangement 24.

The driven-side ring gear 82 can also be formed with ring gear segments of this kind in the different embodiments described above and in the following. When the planetary transmission arrangement is formed with sun gears, it is also possible for the teeth formed thereon to be segmented in this way. Segmented teeth of this kind can also cooperate with planet gears 74 which are constructed in a segmented manner as shown, for example, in FIG. 6.

The planet gears 74 and, as the case may be, also ring gear segments or sun gear segments can, of course, be arranged equidistant, i.e., at an equal angular distances, in circumferential direction in the embodiments described above and in the following. This is a particularly advantageous construction for reasons of symmetry and for preventing imbalances. However, it is also possible generally to vary the circumferential spacing of the planet gears 74 so that not every planet gear has the same distance from the planet gear or planet gears directly adjacent in circumferential direction. It has been shown, for example, that with, e.g., three planet gears a circumferential spacing varying by 120°, respectively, i.e., an irregular arrangement, is advantageous with respect to noise generation of the mutually engaging teeth. Of course, an arrangement of this kind which diverges from a uniform circumferential sequence can also be provided for other quantities of planet gears.

Figure 30:
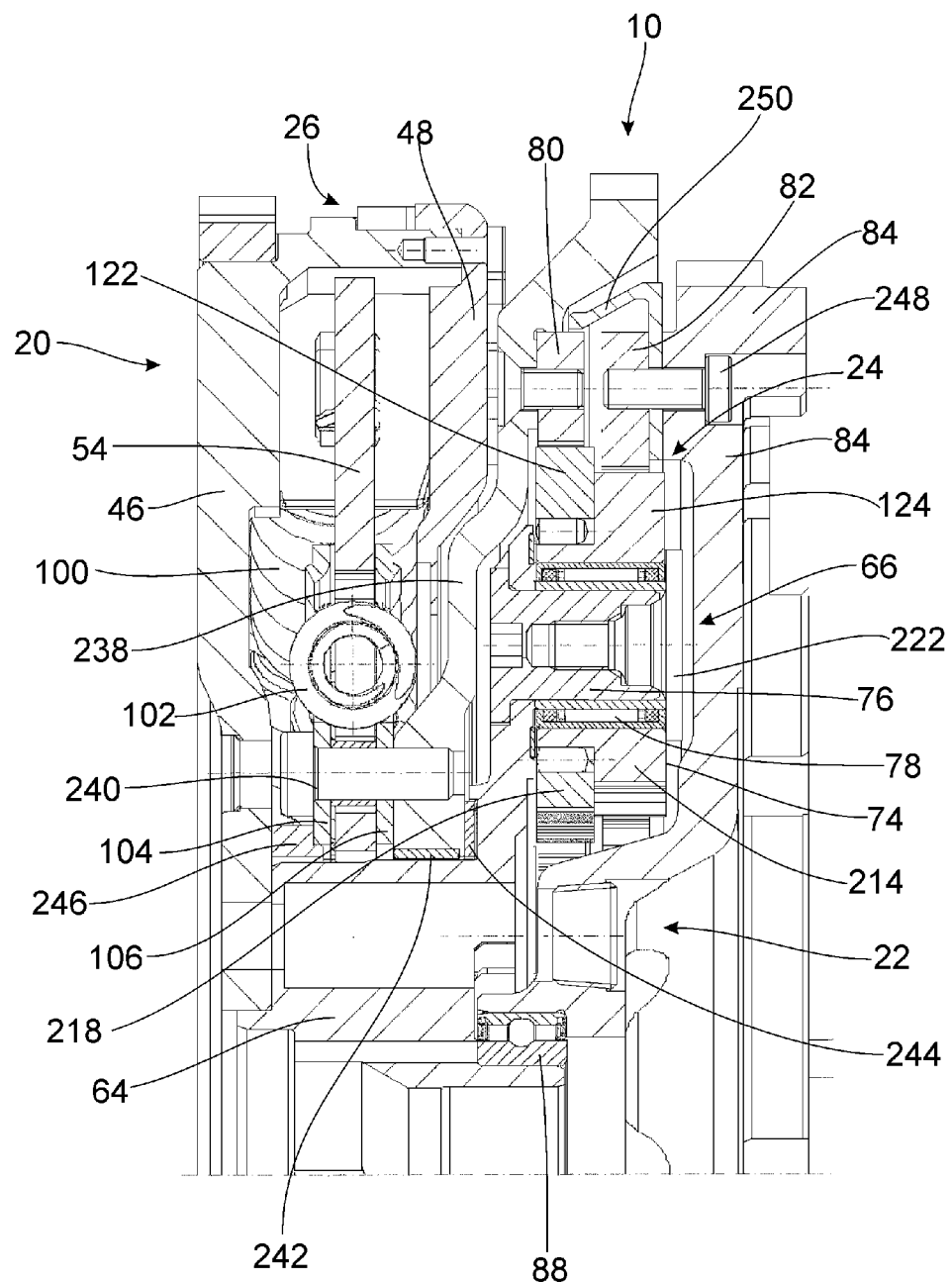
FIG. 30 is a fragmentary longitudinal sectional view of a torsional vibration damping arrangement with two parallel torque transmission paths.
Figure 31:
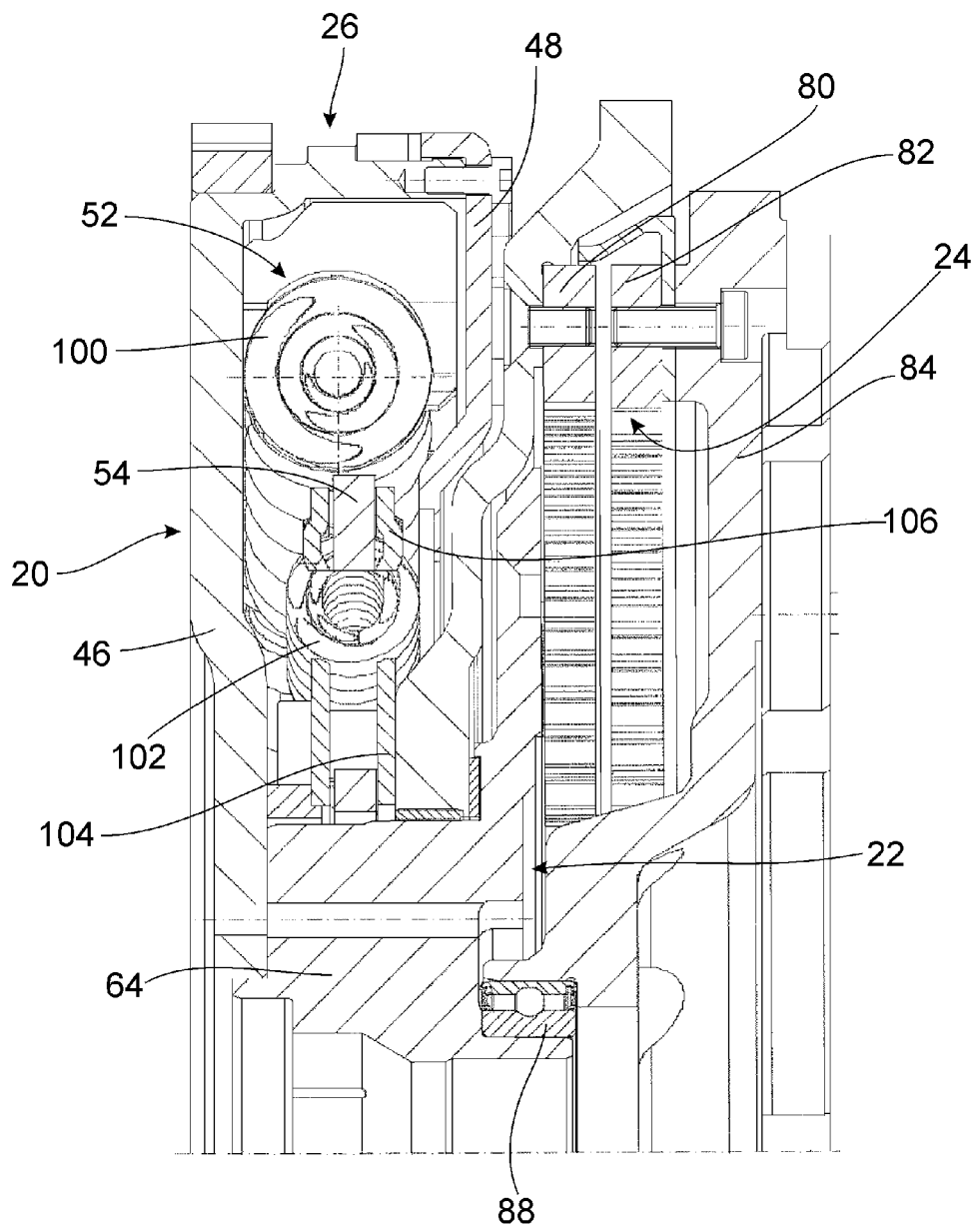
FIG. 31 is a torsional vibration damping arrangement from FIG. 30 sectioned in a different circumferential region.
Figure 32:
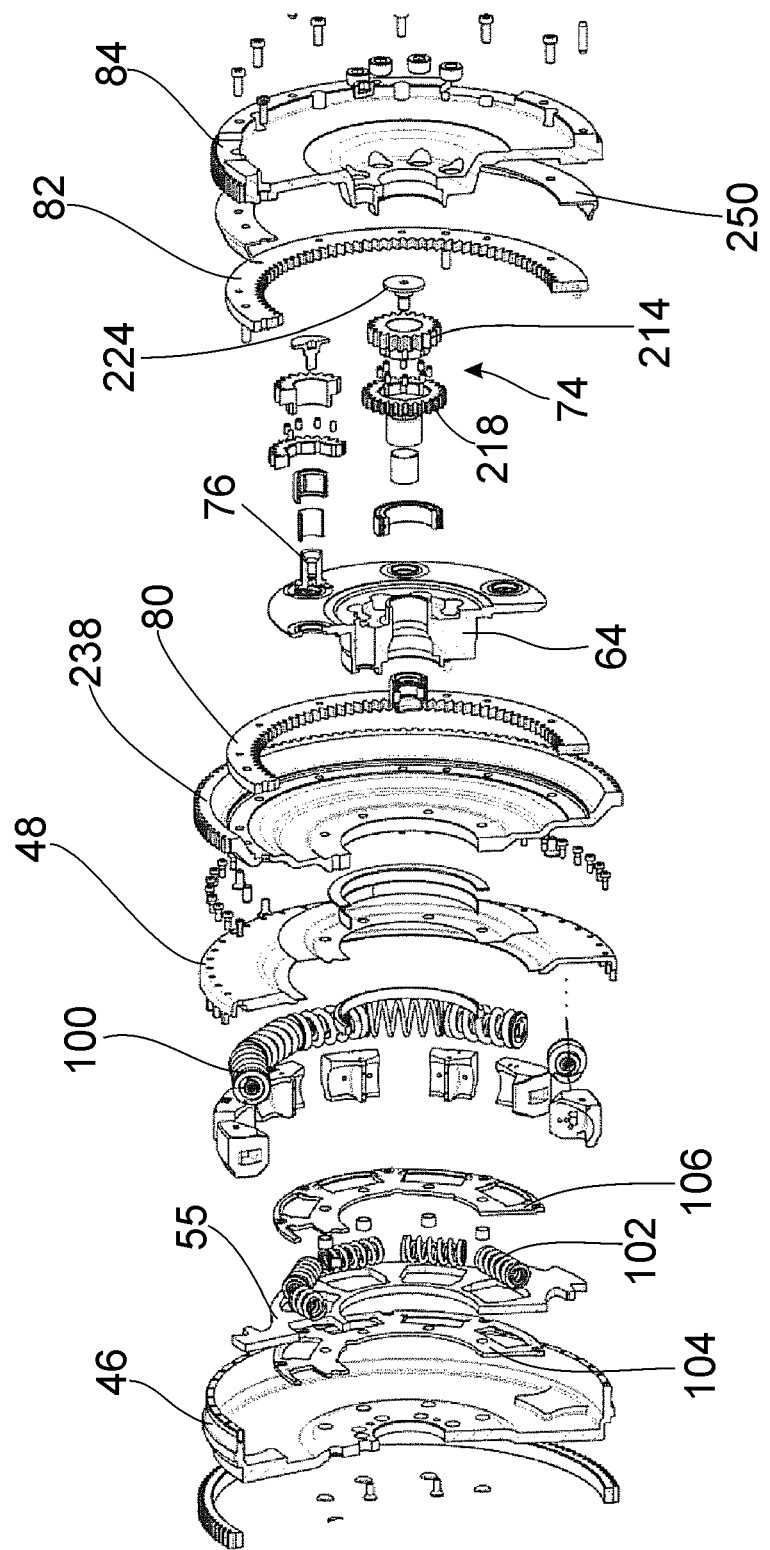
FIG. 32 shows the torsional vibration damping arrangement from FIGS. 30 and 31 in a sectional exploded view.

FIGS. 30 to 32 show an embodiment of a torsional vibration damping arrangement 10 which basically corresponds to the construction described above referring to FIG. 7. It will be seen particularly in FIG. 30 that the planet gear carrier 64 with planet gears 74 carried thereon has the construction shown in FIG. 26, i.e., the planet gears 74 are formed in two parts in a stepped manner and the planet gear carrier 64 is pinned through the supporting ring 222.

It can be seen further that the drive-side ring gear 80 is fixed, e.g., screwed but possibly also riveted, welded, or the like, to an annular disk-shaped ring gear carrier 238. The embodiment with screws has the advantage of a particularly simple construction and affords the possibility, for carrying out repairs, if necessary, to easily remove the ring gear 80 again.

Radially inwardly, the ring gear carrier 238 is fixedly connected to the two cover disk elements 104, 106 by a plurality of screw bolts 240 which penetrate the central disk element 54 with circumferential movement play. In this case also, of course, the connection could also be carried out, for example, by riveting, although the use of screw bolts 240 is particularly advantageous with respect to assembly and, if required, also for repair work. In its radially inner region, the ring gear carrier 238 is supported radially and axially at the planet gear carrier 64 by bearings 242, 244 which are formed, for example, with plain bearing rings. Of course, rolling element bearings can also be used. The ring gear carrier 238 is axially supported in direction of the cover disk element 46 by the cover disk element 104 adjacent to cover disk element 46 and by a bearing ring 246.

In this case and, of course, in the other embodiments, the planet gears 74 can be rotatably carried at the support pin 76 via a bearing support 78 comprising needle bearings. These needle bearings can be sealed, for example.

The driven-side ring gear 82, as separate structural component part, is fixedly connected to the friction surface element 84, for example, a flywheel disk of a friction coupling, by screw bolts 248. Together with the driven-side ring gear 82, a seal element 250 which is constructed, for example, as sheet metal material is fastened by the screw bolts 248. This seal element 250 contacts the outer circumference of the drive-side ring gear 80 at a slight distance or under a slight pressure, possibly via a sealing lip, so that the volume region containing the planetary transmission arrangement 66 is enclosed.

A particular advantage of the embodiment shown in FIGS. 30 to 32 is that this torsional vibration damping arrangement can be screwed to a crankshaft or other driveshaft by a conventional crankshaft screw fastening without requiring additional steps for adapting. Considering this, it is easily possible to integrate this torsional vibration damping arrangement in a drivetrain of conventional construction.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

The invention claimed is:

1. A torsional vibration damping arrangement, comprising:
    an input region to be driven in rotation around an axis of rotation;
    an output region;
    a first torque transmission path provided between the input region and the output region;
    a second torque transmission path parallel to the first torque transmission path and provided between the input region and the output region;
    a first phase shifter arrangement provided in the first torque transmission path and constructed for generating a phase shift of rotational irregularities transmitted via the first torque transmission path relative to rotational irregularities transmitted via the second torque transmission path; and
    a coupling arrangement provided between the input region and the output region, the coupling arrangement constructed for destructively superposing torques transmitted via the first and second torque transmission paths,
    wherein the coupling arrangement includes a planetary transmission arrangement;
    wherein the planetary transmission arrangement includes a planet gear carrier connected to the second torque transmission path and having a plurality of planet gears rotatably carried thereon;
    wherein the planetary transmission arrangement includes:
    a first ring gear arrangement in meshing engagement with the planet gears and connected to the first torque transmission path, and
    a second ring gear arrangement in meshing engagement with the planet gears and connected to the output region;
    or wherein the planetary transmission arrangement includes:
    a first sun gear arrangement in meshing engagement with the planet gears and connected to the first torque transmission path, and
    a second sun gear arrangement in meshing engagement with the planet gears and connected to the output region.

2. The torsional vibration damping arrangement according to claim 1, wherein the torsional vibration damping arrangement is for a drivetrain of a vehicle.

3. The torsional vibration damping arrangement according to claim 1, wherein the first phase shifter arrangement includes a first oscillation system having a primary side and a secondary side which is rotatable relative to the primary side around the axis of rotation against a force of a spring arrangement.

4. The torsional vibration damping arrangement according to claim 3, further comprising a second phase shifter arrangement provided in the second torque transmission path.

5. The torsional vibration damping arrangement according to claim 4, wherein the second phase shifter arrangement includes a second oscillation system with a primary side and a secondary side which is rotatable relative to the primary side of the second oscillation system around the axis of rotation against an action of a further spring arrangement.

6. The torsional vibration damping arrangement according to claim 5, wherein the first oscillation system and the second oscillation system have resonant frequencies that differ from one another.

7. The torsional vibration damping arrangement according to claim 6, wherein a resonant frequency of the first oscillation system is below a resonant frequency of the second oscillation system.

8. The torsional vibration damping arrangement according to claim 1, wherein at least one of the first torque transmission path and the second torque transmission path is formed with at least one of a frictional damping arrangement and a fluidic damping arrangement for the rotational irregularities transmitted via at least one of the first torque transmission path and the second torque transmission path.

9. The torsional vibration damping arrangement according to claim 8, wherein the frictional damping arrangement and the fluidic damping arrangement are arranged so as to act one of in parallel and in series with one another.

10. The torsional vibration damping arrangement according to claim 8, wherein at least one of the frictional damping arrangement and the fluidic damping arrangement is arranged so as to act one of in parallel and in series with a spring arrangement.

11. The torsional vibration damping arrangement according to claim 1, wherein one of the first ring gear arrangement and the first sun gear arrangement in connection with the planet gears and one of the second ring gear arrangement and the second sun gear arrangement in connection with the planet gears provide transmission ratios which differ from one another.

12. The torsional vibration damping arrangement according to claim 11, wherein at least one of the planet gears, the first ring gear arrangement, the second ring gear arrangement, and the first sun gear arrangement is constructed as a segmented gear.

13. The torsional vibration damping arrangement according to claims 1, wherein the planet gears are arranged so as to be substantially circumferentially equidistant from one another.

14. The torsional vibration damping arrangement according to claim 1, wherein the planet gears are arranged at unequal distances from one another circumferentially.

15. The torsional vibration damping arrangement according to claim 4, wherein the coupling arrangement is arranged radially inside at least one of the first phase shifter arrangement and the second phase shifter arrangement in an at least partially axially overlapping manner.

16. The torsional vibration damping arrangement according to claim 4, wherein the coupling arrangement is arranged axially adjacent to at least one of the first phase shifter arrangement and the second phase shifter arrangement.

17. The torsional vibration damping arrangement according to claim 1, wherein the second torque transmission path has a stiffness of at least 800Nm/°.

18. The torsional vibration damping arrangement according to claim 1, wherein the second torque transmission path has a stiffness of at least 1500 Nm/°.

19. The torsional vibration damping arrangement according to claim 1, wherein at least one of:
   a ratio of a mass moment of inertia of the input region to a mass moment of inertia in the first torque transmission path is in the range of 1 to 10, and
   a ratio of the mass moment of inertia in the first torque transmission path to a mass moment of inertia in the second torque transmission path is in the range of 2 to 20.

20. A hybrid drive module comprising a torsional vibration damping arrangement according to claim 1.

21. A hydrodynamic coupling arrangement, comprising a torsional vibration damping arrangement according to claim 1.

22. The hydrodynamic coupling arrangement according to claim 21, wherein the hydrodynamic coupling arrangement includes a hydrodynamic torque converter.

23. A drive system for a vehicle, comprising:
   a drive unit; and
   a torsional vibration damping arrangement according to claim 3, wherein the input region can be driven by a driveshaft of the drive unit for rotation around the axis of rotation.

24. The drive system according to claim 23, wherein a resonance of the first oscillation system is one of below and near an idling speed of the drive unit.

25. The drive system according to claim 5, wherein a resonance of the second oscillation system is one of above and near a maximum speed of the drive unit.

\* \* \* \* \*